United States Patent [19]
Dickinson et al.

[11] Patent Number: 5,685,153
[45] Date of Patent: *Nov. 11, 1997

[54] EFFICIENT UTILIZATION OF CHLORINE AND/OR MOISTURE-CONTAINING FUELS AND WASTES

[75] Inventors: Norman L. Dickinson, Monte Sereno; Robert G. Murray, Palo Alto, both of Calif.; Michael K. Klosky, Suwanee, Ga.

[73] Assignee: EnerTech Environmental, Inc., Atlanta, Ga.

[*] Notice: The term of this patent shall not extend beyond the expiration date of Pat. No. 5,485,728.

[21] Appl. No.: 486,026

[22] Filed: Jun. 7, 1995

Related U.S. Application Data

[63] Continuation-in-part of Ser. No. 152,796, Nov. 15, 1993, Pat. No. 5,485,728, which is a continuation-in-part of Ser. No. 763,000, Sep. 20, 1991, Pat. No. 5,261,225, which is a continuation of Ser. No. 388,069, Jul. 21, 1989, Pat. No. 5,050,375, which is a continuation-in-part of Ser. No. 123,280, Nov. 20, 1987, abandoned, which is a continuation-in-part of Ser. No. 813,486, Dec. 26, 1985, Pat. No. 4,714,032.

[51] Int. Cl.$^6$ .................................................. F01K 17/00
[52] U.S. Cl. .................................. 60/648; 44/280; 44/281; 110/238
[58] Field of Search .......................... 60/648; 44/280, 44/281; 110/221, 224, 238, 263, 347, 342

[56] References Cited

U.S. PATENT DOCUMENTS

| | | |
|---|---|---|
| 4,126,519 | 11/1978 | Murray . |
| 4,192,653 | 3/1980 | Giannetti et al. . |
| 4,486,959 | 12/1984 | Chang .................................... 44/280 |
| 4,579,562 | 4/1986 | Tarman et al. . |
| 4,762,527 | 8/1988 | Beshore et al. . |
| 4,915,706 | 4/1990 | Daley et al. .......................... 44/280 |
| 4,922,841 | 5/1990 | Kent ..................................... 110/238 |
| 5,188,739 | 2/1993 | Khan et al. . |
| 5,188,740 | 2/1993 | Khan . |
| 5,188,741 | 2/1993 | Zang et al. . |
| 5,211,723 | 5/1993 | Khan . |
| 5,211,724 | 5/1993 | Khan et al. . |
| 5,217,625 | 6/1993 | Khan et al. . |
| 5,230,211 | 7/1993 | McMahon et al. . |
| 5,234,468 | 8/1993 | Khan . |
| 5,234,469 | 8/1993 | Khan et al. . |
| 5,264,009 | 11/1993 | Khan . |
| 5,266,085 | 11/1993 | McMahon et al. . |
| 5,273,556 | 12/1993 | McMahon et al. . |
| 5,292,442 | 3/1994 | Khan et al. . |
| 5,356,540 | 10/1994 | Khan . |
| 5,485,728 | 1/1996 | Dickinson ............................ 60/648 |

*Primary Examiner*—John T. Kwon
*Attorney, Agent, or Firm*—Townsend and Townsend and Crew

[57] ABSTRACT

A process for enhancing the fuel form, raising the energy content, and lowering the level of impurities of low rank coals and/or carbonaceous wastes, like Municipal Solid Waste (MSW), Refuse Derived Fuel (RDF), and sewage sludge, by providing the low rank fuel, carbonaceous waste, or mixtures thereof as a slurry in water of processable viscosity. This feed slurry is heated under pressure, usually in the presence of an alkali, to a temperature at which a significant physical and molecular rearrangement occurs, characterized by the splitting off of a substantial proportion of the oxygen bound in the low rank coal or carbonaceous waste as carbon dioxide. At these conditions, solid particles in the feed slurry lose much of their fibrous and hydrophilic character, and are broken up into smaller particles of char, resulting in a slurry of dramatically improved rheology, i.e., capable of a much higher solids concentration (or energy density) at processable viscosity. Simultaneously, cation and anion impurities, like sodium, potassium, chlorine, sulfur, nitrogen, toxic metals, and others, are significantly reduced in the resulting product char slurry fuel.

65 Claims, 3 Drawing Sheets

EFFICIENT UTILIZATION OF CHLORINE AND/OR MOISTURE-CONTAINING FUELS AND WASTES

CROSS-REFERENCE TO RELATED APPLICATIONS

This application is a Continuation-in-Part of application Ser. No. 08/152,796, filed Nov. 15, 1993, now U.S. Pat. No. 5,485,728, which is a Continuation-in-Part of application Ser. No. 07/763,000, filed Sep. 20, 1991 (U.S. Pat. No. 5,261,225), which is a Continuation of Application Ser. No. 388,069, filed Jul. 21, 1989 (U.S. Pat. No. 5,050,375), which is a Continuation-in-Part of abandoned application Ser. No. 123,280, filed Nov. 20, 1987, which was a Continuation-in-Part of application Ser. No. 813,486, filed Dec. 26, 1985 (U.S. Pat. No. 4,714,032). It is also related to application Ser. No. 294,424, filed Jan. 9, 1989 (U.S. Pat. No. 4,898,107), which is a Continuation-in-Part of abandoned application Ser. No. 100,531, filed Sep. 24, 1987, which was also a Continuation-in-Part of application Ser. No. 813,486 (U.S. Pat. No. 4,714,032).

BACKGROUND OF THE INVENTION

This and the referenced inventions are addressed to the related national problems of energy security, waste disposal, and air quality. In particular, it is addressed to the environmentally responsible utilization of potential domestic energy resources which are not used, or under-used, because of impurities (notably moisture, chlorine, sulfur, ash, and toxic metals), heterogeneous character, low heating value, and poor handleability.

Fossil fuels and cellulose, biomass, or organic wastes are said to be carbonaceous, i.e., to have a molecular skeleton of carbon atoms. In addition, coals are "ranked" according to their geological age. Those of high rank (oldest) have high carbon and low oxygen contents, with little water bound in the coal structure. Anthracite and bituminous coals are considered high rank. As rank (age) decreases, coals have decreasing carbon and increasing oxygen and moisture contents, and hence a lower heating value per unit weight. Sub-bituminous and lignite are low rank coals. Although not called coal, peat is a fossil fuel still lower in age or rank than lignite.

Fossil fuels difficult to place on the ranking scale include refinery residues, used automobile oil, and Orimulsion. Orimulsion is a mixture of water and bitumen with proprietary additives. Called an emulsion because bitumen (although appearing solid) is technically an extremely viscous liquid, Orimulsion can be considered, for practical purposes, equivalent to a slurry. High in sulfur (about 2.7%) and metals (vanadium, nickel, sodium and potassium), when burned conventionally it requires expensive flue gas scrubbers and electrostatic precipitators or baghouses.

A variety of cellulosic, biomass, and organic products, by-products, and wastes (carbonaceous wastes) are not fossil fuels but can be considered even lower in age and rank than peat. Compared with low ranked fossil fuels, they contain less carbon and more oxygen. Among these are Municipal Solid Waste (MSW) and Refuse Derived Fuel (RDF), produced from MSW by removing recyclable materials. To these can be added the variety of woody or cellulosic products and by-products of agriculture (bagasse, rice hulls, straw, orchard pruning, etc.) and forestry (scrap wood, sawdust, bark, limbs, etc.), and industry based upon them. Most are fibrous and normally associated with substantial water. Similar wastes, not usually considered biomass, include industrial waste water treatment sludges like pulp, paper, and de-inking mill sludges, sewage sludge, livestock manure, industrial wastes, construction and demolition wastes, mixed plastics or automobile shredder residue (ASR). Although not considered a waste, Kraft mill black liquor, a by-product of sulfate pulping, is a cellulosic based water slurry.

Lower rank coals, sub-bituminous and lignite, are important commercial fuels, usually mined at low cost and relatively abundant. Powder River Basin sub-bituminous has another attractive feature—it is low in sulfur and in considerable demand by utilities having difficulty meeting sulfur dioxide emission regulations. However, their high moisture contents, and correspondingly low heating values, make them expensive to ship to market and inefficient to burn.

In contrast to the ease, economy and cleanliness with which fluid fuels are pipe-lined around the country, solid fuels are burdened with open mechanical excavators, conveyors, bulldozers, crushers, hoppers, railroad cars, pilers, reclaimers, grinders, etc., all of which require labor and create noise, dust, loss and polluted runoff. The existing mechanical culture of solid fuels utilization needs lump fuel of limited size range. In crushing oversize material to conform, considerable coal that does not meet minimum size requirements is wasted. Altogether, rejected coal "fines" amount to roughly 100 million tons per year in the U.S. and have accumulated in ponds, dumps, river banks, etc. to comprise a massive environmental headache of somewhere between 2 and 5 billion tons.

Carbonaceous wastes, especially MSW, RDF, and sludges, are the fuels most heavily penalized by their physical form. Pieces are not only extremely variable in size and shape, but also differ drastically in their moisture contents, plasticity, density, and ease of ignition. Consequently, the conventional art of combustion is burdened with complicated handling, old-fashioned stokers or moving grates, huge requirement for excess air, extensive air pollution control equipment, poor controllability, and little fuel versatility, all of which aggravate the difficulty of meeting stringent flue gas emission regulations. Although substantial in quantity, only a small proportion of carbonaceous wastes is utilized as fuel.

Compounding coal's solid form handicap in the energy market are its impurities. A significant content of ash inflates shipping, emissions control, maintenance and disposal costs. Moisture is costly to ship and lowers boiler efficiencies. Sulfur and nitrogen contents are considered responsible for acid rain and require expensive control devices to meet clean air standards. Chlorine in some coals causes expensive boiler tube corrosion, and/or requires costly alloy. Moreover, chlorine is implicated in a long list of carcinogenic compounds, some as yet unregulated, believed present in flue gases from coal burning (most notorious being dioxins, furans, and PCBs). Other halogens also occur in some coals. Overall, the Clean Air Act Amendments (CAAA) of 1990 have identified 189 unregulated Hazardous Air Pollutants (HAPs), which the U.S. Environmental Protection Agency (EPA) must characterize to determine public health threat and develop appropriate regulations. These HAPs include the trace metals: antimony, arsenic, beryllium, cadmium, chromium, cobalt, copper, lead, manganese, mercury, nickel, and selenium.

Conversion of carbonaceous wastes, specifically MSW, to energy also is impeded by impurities. Water contents are high and extremely variable. Ash contents also can be high. Toxic lead, cadmium, mercury, and other heavy metals appear in the flue gases and have to be controlled by scrubbers, filters, and other sophisticated air pollution control systems. Chlorine, originating with chlorinated plastics such as PVC, averages about 0.5% but can range to as high as 1.8% in MSW or RDF. It engenders corrosion of boiler tubes, requires alkali scrubbers, and contributes to the formation of dioxins, furans and probably other hazardous air pollutants. Although chlorine receives the lion's share of attention, carbonaceous wastes also may contain lesser amounts of other halogens. In particular, fluorine from fluorinated (or chlorofluorinated) polymers may, in some cases, have toxic and/or fouling consequences. Combustion ash is sometimes classified as hazardous on the basis of the EPA's Toxicity Characteristics Leaching Procedure (TCLP) test. Literature discloses that hazardous ash can be made to pass the TCLP test by heating it to or above its melting point, a process known as "vitrification".

The world has thousands of sites at which carbonaceous wastes have been dumped for decades, and even centuries. Although dumping practices have improved and are now regulated as "landfilling", much discarded refuse lies decaying under conditions now considered environmentally unsatisfactory. There is public pressure, which is bound to increase, to remedy such old dump and landfill sites. Besides the potential hazards, liability, and mandated post-closure maintenance, much recyclable material and potential energy lies buried, awaiting economic means of recovery.

Power plants have burned RDF with coal in utility and industrial boilers (generally referred to as co-firing). The CAAA of 1990 allow up to 30% of the fuel input to the boiler to be carbonaceous wastes, without reclassifying the boiler as a waste incinerator. Co-firing has been practiced commercially in numerous boilers. While lower $SO_2$ emissions provided the impetus, co-firing low sulfur carbonaceous wastes with higher sulfur coal suffered from several disadvantages including increased solids handling costs, increased excess air requirements, higher HCl, CO, $NO_x$ and chlorinated organic emissions, increased slag formation in the boiler, and higher fly ash resistivity. In addition, commercial co-firing has been limited to grate and cyclone boilers. Technical hurdles have not been overcome for co-firing carbonaceous wastes in pulverized coal boilers, which represent the majority of the U.S. utility power plant capacity. However, there has been a revival of interest in co-firing because of some evidence that sulfur oxides from coal inhibit the formation of dioxins from chlorine containing carbonaceous wastes, and the high cost of achieving the CAAA of 1990 for coal in conventional ways.

Inventors and entrepreneurs have responded to the moisture/heating value drawback of low rank coals by putting forward a variety of carbonization and pyrolysis processes, in which moisture and oxygen are driven off by heat. In other words, the low rank coal is thereby enriched in carbon. Although heating value is improved, the product tends to be troubled by dusting and spontaneous combustion. Removed moisture, heavily contaminated with complex organic chemicals, presents a difficult disposal problem (addressed, for example, in U.S. Pat. No. 5,000,099). These carbonization processes, moreover, handle and process raw material and product as solid fuels, through a sequence of conveying, crushing, screening, heating, cooling, etc. steps, at considerable expense and opportunity for pollution and loss.

The Department of Energy (DOE) and private entrepreneurs have tried to address the often-overlooked form penalty, which solid fuels have to bear, relative to oil and gas which are fluid fuels. One of the most extensive of such attempts has comprised programs to convert coal into a liquid slurry fuel, called Coal-Water-Fuel (CWF) or Coal-Water-Mixture (CWM), which has been successfully fired in boilers and furnaces designed for oil. Specially prepared CWFs have also been fired in experimental diesel engines and gas turbine combustors. Unfortunately, most coals require extensive beneficiation and expensive additives, making the cost of energy, in CWF form, roughly double that of the coal from which it is made. At the time of this application world oil prices are so low that this technically feasible substitution is economically unfeasible.

While fluid CWFs (slurries) have been burned successfully in boilers designed for pulverized coal and oil, carbonaceous wastes are not fired in this way because, in order to be pumpable, their slurries would be so dilute that they would have little positive (and in some cases negative) energy value. High rank coals, anthracite and bituminous, can be ground and slurried to a pumpable solids concentration of 50% or higher. As rank decreases, there is a deterioration in slurryability. Poor slurrying characteristics of low rank fuels or carbonaceous wastes are associated with their fibrous and hydrophilic nature. However, as is pointed out in U.S. Pat. No. 4,380,960, a slurry of a hydrophilic fuel (low rank fuel or carbonaceous waste) can be concentrated by heating to a temperature at which physical and molecular rearrangement occurs, with carbon dioxide and water being split off, resulting in a less hydrophilic and less fibrous fuel (char) for which the maximum pumpable concentration is considerably increased. This process is sometimes referred to as "Slurry Carbonization".

Municipal solid waste, fuel derived from it, and numerous other high moisture wastes contain micro-organisms which limit the time they may be stored without odor and other deterioration. Perishability, together with bulk and heterogeneity, necessitate nearby specialized boilers to convert them (inefficiently) to energy. Since the generation and/or deposit of such wastes is often scattered, there is frequently an insufficient amount of wastes within a given area to justify such expensive conversion (the only alternative being landfilling).

SUMMARY OF THE INVENTION

The thermal efficiency of combustion of a solid-water slurry fuel is a function of the energy density or heating value of the fuel, as expressed in Btu/lb (Kcal/kg) of slurry. Dry basis heating values vary somewhat but the main determinant of energy density is the concentration or weight percentage of solid fuel particles in the slurry. In other words, it is inversely proportional to water content. This concentration is limited by viscosity, which needs to be low enough so that the slurry can be pumped, heated, controlled, and dispersed into combustion air. The viscosity restraint is tolerable with respect to high rank coals, permitting concentrations of about 49% and more without additives and up to about 70% with additives. As rank decreases, slurry concentration or energy density, at processable viscosity, deteriorates, making them increasingly unattractive fuels.

In addition, utilization of low rank coals and carbonaceous wastes is often impaired by impurities other than water, particularly sulfur, chlorine, nitrogen, toxic metals, and slag-forming cations, such as sodium, potassium, and others. The effects of sulfur are ameliorated by methods described in the above-mentioned related patents. The present invention also decreases sulfur and nitrogen but specifically addresses the reduction of water, chlorine, toxic metals and slag-forming cations and anions.

We have discovered that numerous low rank coals and carbonaceous wastes, undesirable fuels for conventional combustion by virtue of form, bulk, location, seasonality, perishability, low heating value, moisture and/or contaminants, can be converted into useful, sterile, and high energy density slurry fuels. We also have discovered that, simultaneously, sodium, potassium, calcium, sulfur, chlorine, nitrogen, heavy metals, other cation and anion impurities, and other soluble compounds, in amounts which would impair utilization by virtue of corrosion, slag formation and/or toxic emissions, can be significantly reduced.

These important enhancements result from providing the low rank fuel, carbonaceous waste, or mixtures thereof as a slurry in water of processable viscosity. This slurry is carbonized, meaning it is heated under pressure, usually in the presence of an alkali, to a temperature at which a significant physical and molecular rearrangement occurs, characterized by the splitting off of a substantial proportion of the oxygen bound in the low rank coal or carbonaceous waste as carbon dioxide. The temperature necessary for this rearrangement depends on the characteristics of the feed slurry but is usually between 430° and 700° F. (220° and 370° C.). The pressure necessary is a function of the vapor pressure of the water at the maximum temperature, plus the partial pressure of the carbon dioxide gas generated and other gases present. At these conditions, solid particles in the feed slurry lose much of their fibrous and hydrophilic character and are broken up into smaller particles of char, resulting in a slurry of dramatically improved rheology, i.e., capable of a much higher concentration and energy density at a processable viscosity.

In addition, the aggressively hydrolyzing conditions free organically bound chlorine (even from such stable polymers as PVC), and sulfur and other anions react with the alkali and dissolve in the aqueous phase. Previously bound cations, such as sodium and potassium, are likewise made accessible to aqueous dissolution. The physical and molecular rearrangement during slurry carbonization affords an additional opportunity to dissolve or suspend, in the superheated water, the majority of any toxic metals remaining from the feed slurry. The fine particle size and aqueous slurry form, as well as its elevated temperature, allow the vast experience of industrial and academic chemistry to be brought to bear on undesirable impurities (including those which may not yet be identified). For example, agents specific to the solubilization, extraction, precipitation, or neutralization of one or more impurities, including acids, alkalis, peroxides and sequestering agents, may be added before, during and/or after heating and/or char concentrating.

Some low rank coals and carbonaceous wastes, such as sewage sludge, may already be in slurry form, and require no further preparation. Others, such as manure, may be semi-solid and become slurries when mixed with additional water, waste water, or other slurries. The production of unwanted fine coal, and the vast backlog of past production, by definition finely divided and usually already wet, is a near ready-made source of low grade coal. If solid and relatively dry, the low rank coal and carbonaceous wastes are shredded, chipped, ground, pulped, and/or subjected to other conventional size reduction, and mixed with water, waste water, and/or other slurries to permit preparation of a processable slurry.

Dense inorganics are preferably separated from the low rank coals, carbonaceous wastes, or mixtures thereof before slurry carbonization. If the feed materials contain appreciable inorganic material that can be separated on the basis of density, other physical properties, and/or chemical properties, appropriate separation is performed. In the case of MSW, U.S. Pat. No. 4,624,417 (Gangi) describes a suitable method (wet resource recovery) of slurrying and separating dense debris, iron, glass and non-ferrous metals, including preliminary concentration of carbonaceous slurry to a suitable viscosity. U.S. Pat. No. 4,561,860 (Gulley) describes a suitable method (dry resource recovery) for removing inorganics from MSW through shredding; trommel, jig and vibrating screens; and magnetic, eddy current and air classification separators, to produce a solid RDF which can be mixed with water, waste water, and/or other slurries to form a feed material of suitable viscosity for slurry carbonization. There is extensive literature and patent art describing methods and apparatus (wet and dry processes) for separating inorganics from coal.

When low rank coals or carbonaceous wastes contain appreciable halogens, sulfur, and/or other acid-forming anions, alkali is added (if not already present), before, during and/or immediately after slurry carbonization. When slurry is carbonized in admixture, alkali naturally occurring in some low rank coals decreases the amount to be added, or makes it unnecessary. Since MSW, RDF, other carbonaceous wastes, and coals contain chlorine and other halogens (which can form halogen acids when the slurry is carbonized) and a significant number of fuels and wastes contain the alkaline elements, sodium, calcium, magnesium and potassium, they are a natural fit to be co-processed through slurry carbonization. Not only are both turned into uniform, high energy density slurry fuels, but their chemical impurities tend to neutralize one another. (Depending on proportions, some additional alkali may be required.) It is most logical to extend the co-processing of low sulfur organic wastes to include otherwise non-compliant and high sulfur fossil fuels, and hence produce a char slurry fuel with lower $SO_2$ emissions (on a per unit energy basis) when utilized than the fossil fuel alone.

The conventional method of transferring heat from a reactor effluent to its influent is by indirect heat transfer through heat exchange surface. We have discovered that heat in a pressurized aqueous effluent, at a temperature above its atmospheric boiling point, can economically be exchanged to a viscous influent by reducing the effluent pressure in stages and flashing steam from it at successively lower pressures. The steam from each of these flashes is blended directly into the influent at an incrementally lower pressure. This discovery is particularly applicable to pressurized, viscous slurries which have fouling tendencies and/or for which indirect heat transfer rates are poor.

The conventional method of generating pressurized slurries is with a slurry of sufficiently low viscosity and a pumping device (piston, hose, diaphragm, etc. pumps). In the conventional art, a sufficiently low pumping viscosity, for low rank coal and carbonaceous waste slurries, is generated by adding additional water to the slurry, which adds greatly to the size and expense of the pump and other downstream equipment and which requires process water and the treatment of removed char slurry water. We have discovered as an alternative that a dramatically higher solid loading carbonaceous slurry can be heated and processed, in a counter current flow of fluid and carbonaceous solids, using two mechanically rotating screws of variable pitch. With this discovery, a carbonaceous slurry with higher solids loading can be heated in the system. This significantly reduces the needed capacity of process equipment and process heat requirements, reduces or eliminates the need to concentrate the product char slurry, and/or reduces and/or eliminates the treatment of removed char slurry water.

Should the char slurry resulting from the process be essentially free of harmful dissolved salts and/or other materials, it may be concentrated to the maximum viscosity suitable for storage, transport and eventually charging to combustion, or for other use, with centrifuges, filters, evaporators, and/or other appropriate dewatering devices, and/or by blending the dilute char slurry with another solid fossil fuel. If, on the other hand, the char slurry contains appreciable dissolved salts and/or minerals which would cause operating difficulty and/or result in the release of pollutants when utilized, the solid char is separated essentially completely from the aqueous phase and re-slurried, to maximum processable viscosity, in clean water. It may additionally be desirable to wash the wet char with clean water before re-slurrying. Further, the wet char may also be re-slurried with liquid hydrocarbon products, such as diesel oil, for example, to form a fuel slurry. While the high energy slurry is a preferred form, it also is feasible to dewater, dry and pelletize the solid char to form a high grade solid fuel product.

The moisture removed from the char slurry may contain dissolved and suspended species. The majority of this removed moisture is preferably reused as the slurry water for the feed material(s). Due to the accumulation of dissolved and suspended species in this recycled water, a portion may have to be purged from the process and treated by conventional methods prior to reuse as recycled water and/or discharge. In certain situations, it is preferable to reuse the removed, recycled, or treated water as the slurrying medium for the char product, and hence any dissolved and suspended organics will be oxidized with the slurry fuel, and any dissolved and suspended inorganics will remain as combustion ash.

Although the carbonization reaction reduces particle sizes, contributing to greatly improved energy density, further size reduction by grinding, shearing, and/or utilizing specially designed, simultaneous pressure and particle size reducing devices, or attritors, often permits still higher solids loading and energy density. "Grindability" is much improved over that of the carbonaceous feed stock. Selective size reduction of a portion of the char also often results in further improvements due to bi-modal particle size distributions. After slurry co-carbonization and concentration, blends of different feed stocks frequently exhibit higher energy density, at a specified viscosity, than slurries of either alone. The addition of one or more of the viscosity improvement additives known to the art of CWFs is a further option for maximizing the energy density of product slurry.

The char slurry of the present invention is preferably used as a fuel for steam, heat, and/or electricity generation in boilers, kilns, incinerators, furnaces, diesel engines, or gas turbines. Boilers may be of any type (pressurized or essentially atmospheric), including those designed for fuel oil and/or pulverized coal burners. However, in many cases the char itself, or as the concentrated slurry, may be used as a reactive source of carbon and hydrogen for gasification to synthesis gas, feed stock for catalytic or biochemical reaction to low molecular weight organics, such as methanol, acetic acid, etc., hydrolysis, reforming, liquefaction, or for the production of carbon black, activated carbon, etc.

Thus, the relatively clean and noncorrosive char slurry attained with the present invention can be conveniently and inexpensively stored for later use and/or transported to a point of use. Heat energy from scattered low grade fuels becomes available for efficient, centralized use; for example, at a heat and/or power generating plant strategically located so that it can fire char slurry from a relatively large number of sites by piping, trucking, shipping or otherwise transporting the char slurry to the plant. Moreover, the char slurry can be used when needed; for example, during peak power requirements, since the slurry is readily stored and, relative to its heat value, has a comparatively small volume, while the low grade fuel processing plants can operate continuously.

Further, use of the char slurry is not limited to generating heat with it. The char particles in the char slurry can be converted into combustible gas, which can be further transported to one or more points of use, they can be subjected to liquid phase oxidation to generate the above-mentioned low molecular weight organics, and they can be converted into activated carbon, carbon black, carbon fibers or synthetic gems, all at locations not physically tied to the location where the low grade fuel is present.

Should the char slurry still contain such quantities of toxic metals as might render its ash hazardous, the primary combustion temperature of the char slurry fuel can be adjusted above the melting point of a majority of ash constituents, resulting in ash particles being converted to molten particles (slag) which remain suspended, for a brief time, in the gaseous phase. As the temperature is reduced by additional air, recirculated flue gas, or heat transfer, the molten particles re-solidify, resulting in a vitrified fly ash which will pass the TCLP leaching test.

This invention brings an entirely new dimension to co-firing coals with carbonaceous wastes, especially MSW, RDF and sewage sludge. The proportions of the base fuels may be adjusted to meet sulfur and nitrogen oxide emissions goals without concern for excessive slagging, corrosion, or adverse flue gas emissions. The char slurry fuel has excellent uniformity so that excess air needed for co-firing is minimized and can be controlled more precisely. Moreover, slurried fuels are fired through burners similar to those used with fuel oil and/or pulverized coal (pc), and thus are not limited to old, inefficient stoker or moving grate boilers.

It is therefore an object of the invention to decrease the nation's dependency on imported fuel. The present invention includes the following, more specific objects: providing an improved means of obtaining heat and power from low grade fuels and carbonaceous wastes; the economical utilization of fuel particles which are undersize with respect to conventional coal handling methods; raising the softening point of fuel ash to reduce fouling and slagging; turning a non-uniform solid fuel, such as MSW, RDF or sewage sludge, into a uniform liquid one; converting a bulky fuel into a compact one, easy to store and then transport to a point of use; converting a perishable fuel into a sterile one, storable without deterioration; improving the economics of utilizing fuels burdened with moisture and/or chlorine; ameliorating the discharge of halogen acid gases, halogen-organic pollutants, and/or toxic metals into the atmosphere; efficiently and continuously vitrifying potentially hazardous ashes; better disposing of MSW, RDF, sewage sludge, and other carbonaceous wastes and minimizing the quantity of wastes to be landfilled; excluding potentially toxic materials from landfills; facilitating the remediation of existing landfills by providing a safe and economic disposition of the reclaimed, dirt-contaminated carbonaceous wastes; and economically co-firing otherwise non-compliant fuels. Additional objects will be apparent from a consideration of the drawings and explanations thereof.

DESCRIPTION OF THE PREFERRED EMBODIMENTS

Figure 1:
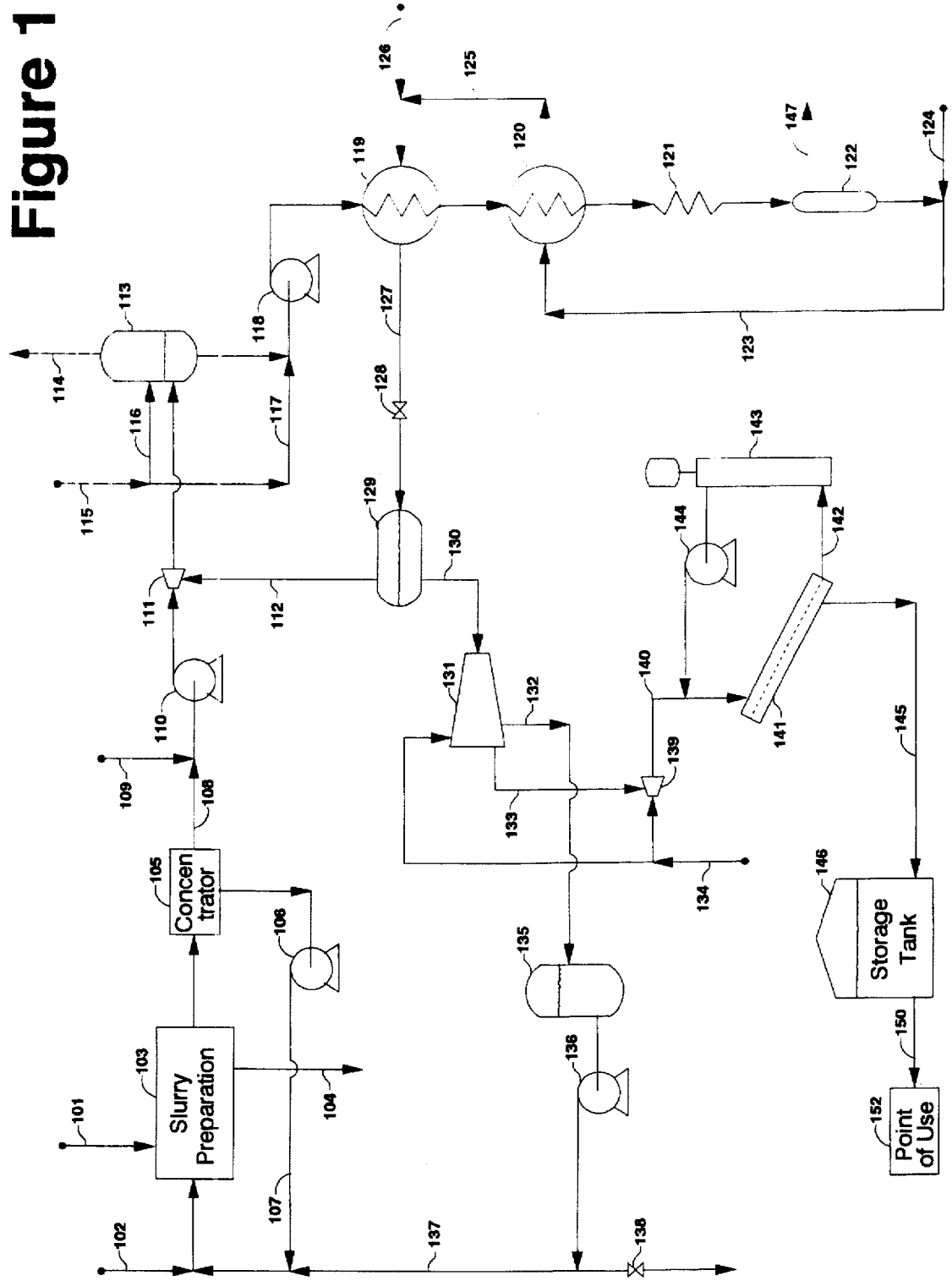
FIG. 1 is a schematic diagram of an embodiment in which dilute slurried low rank coals and/or carbonaceous wastes are heated by indirect exchange under pressure, and converted into a high energy density, low-chlorine char slurry fuel.

The embodiment illustrated in FIG. 1 is representative of the operation of the present invention with respect to low rank coals and/or carbonaceous wastes containing noncombustibles heavier than water and/or one or more anions, such as chlorine, having corrosion and/or air pollution consequences, and/or one or more cations conducive to slagging at combustion temperatures and/or air pollution consequences. Municipal Solid Waste (MSW), which may have been modified by curbside recycling and/or any pre-separation deemed justified, and/or reclaimed from an existing landfill, is used for purposes of illustration.

Carbonaceous waste is charged to the apparatus by a conveying means 101. Make-up water, waste water, and/or other slurries (such as raw sewage sludge) are introduced, if needed, through a line 102. The carbonaceous waste is shredded and mixed with recycled and make-up water in a slurry preparation section 103, which may be a wet Resource Recovery (RR), described in more detail in conjunction with FIG. 1 of the above-referenced, co-pending parent application. In section 103, heavy debris and dirt are settled out and carbonaceous materials dispersed so that metals, glass and other inorganics heavier than water can be separated therefrom. Removed materials leave the apparatus via conduit or conduits 104. Section 103 may also be equipped to separate ingredients less dense than water, which is removed from the section by means of a further conduit (not shown).

Essentially carbonaceous slurry flows to a primary concentrating device 105 (such as a lifting screw or other conventional dewatering device) which separates the majority of its water to form a pumpable carbonaceous slurry. Separated water is returned to the section 103 via a primary recycle pump 106 and a line 107. The apparatus of the section 103 may also accept low rank coals and/or other carbonaceous wastes as described in the Background, either in a mixture with MSW or separately during intermittent periods.

The now viscous carbonaceous slurry leaving the slurry preparation section (or sections) by means of a line 108 may be joined by an alkali solution or slurry from a line 109. Alkali is added in an amount which is at least the chemical equivalent of the acid-forming anions in the carbonaceous slurry. Alkalis are excellent agents for assisting the release and neutralization of acid-forming anions. In some cases, however, removal of cations, including slag-formers and potentially toxic metals, may take precedence. In such cases, solubilizing agents effective for such elements, including, but not limited to, certain acids and chelating agents, may supplement or substitute for the addition of alkali by means of the line 109.

With some easily hydrolyzed wastes, however, alkali added prior to slurry carbonization results in an increase of soluble organic products at the expense of solid char, so that in such instances it is often preferable to decrease or eliminate the alkali addition at line 109 and neutralize acidic products at one or more points subsequent to or during slurry carbonization.

A transfer device 110 such as a pump provides sufficient pressure to discharge the carbonaceous slurry through a gas-slurry mixer 111, in which it is contacted with steam-carbonization gas mixture from a line 112, and/or other hot fluids (not shown). The steam-gas mixture transfers heat directly to the slurry, increasing its temperature. The heated slurry and noncondensed gas flow together to the surge tank 113 in which the gas and remaining steam separates to be discharged from the apparatus through a line 114. The discharged gas, while mainly carbon dioxide, has a heating value and would normally be conducted to a furnace, boiler or flare (not shown). Moreover, the gas and remaining steam may be conducted to a device to further utilize sensible and latent heat (not shown). The tank 113 may include means for heating and be insulated to conserve sensible heat, and/or it can be provided with one or more mixers and/or a re-circulating line to pump 110 (not shown) to aid in maintaining uniformity of slurry properties.

In parallel with section 103, or as an alternative, there may be one or more different types of preparation sections (not shown) suited for fossil fuels or carbonaceous wastes to be slurry carbonized or co-slurry carbonized with that entering by the conveying means 101. For example, a low rank coal, high rank coal, other fossil fuel and/or produced and/or reclaimed coal fines may be subjected to "coal prep" and/or ground and wet beneficiated, as is well known in the art, to produce a suitable feed slurry. A solid RDF, product of a conventional dry resource recovery, may be merely ground and dispersed in make-up or recycled water. Wood waste may be chipped, subjected to magnetic separation of iron, and pulped. Other wastes and/or fossil fuels, such as sewage sludge or orimulsion, may require only adjustment of water content. While high rank coals, particularly those containing chlorine and/or slag formers, may be similarly processed, it is at times advantageous for such coal slurries to bypass the slurry carbonization equipment and be blended with the product char and/or slurry. When justified, the carbonaceous slurry may be "de-gritted" by means of a hydroclone, or hydroclones, designed for this service. If it is necessary to dilute the supplementary carbonaceous slurry substantially for separation of inorganics, the cleaned slurry may utilize the dewatering device 105, or have an equivalent step.

The alternatively prepared carbonaceous slurry, to be slurry carbonized or co-slurry carbonized, may be charged directly via a line 115, or via a line between section 103 and the device 110 (not shown). The alternatively prepared carbonaceous slurry may be added to the tank 113 via a line 116, or via a line 117 to the suction line of a high pressure charge device 118. The high pressure charge device 118 may be from a class of pumps, extruders, screws, or other conventional pressurizing devices, and be a single or multiple devices arranged in series and/or parallel. A blending device (not shown) may be incorporated in the suction line to the charge device 118. Moreover, essentially dry or semi-solid low rank coals, carbonaceous wastes, high rank coals, and/or other fossil fuels may be added directly to the tank 113 via a further conduit (not shown). The charge device 118 draws carbonaceous slurry from tank 113 (and, in some cases, the line 117) and provides sufficient pressure to move it through subsequent pressurized equipment and maintain it essentially in liquid phase when heated.

The carbonaceous slurry flows from the device 118 to the cold side of a low temperature heat exchanger 119, in which it is indirectly heated by and to a temperature approaching the temperature of the char slurry from a line 125. From heat exchanger 119 the partially heated carbonaceous slurry flows to the cold side of a high temperature heat exchanger 120, in which it is indirectly heated by and to a temperature approaching the temperature of the char slurry from a line 123. The heat exchangers 119 and 120 can each be composed of single or of multiple heat exchanger units arranged in series and/or parallel. Moreover, a device which separates a portion of the slurry water from the heated carbonaceous solids (not shown) can optionally be located between the heat exchangers 119 and 120. In such an event the separated water preferably flows to an appropriate heat exchanger to reclaim its sensible heat (not shown), while the partially dewatered carbonaceous slurry flows to the heat exchanger 120.

The hot carbonaceous slurry flows from exchanger 120 to a heater 121, provided to supplement or as an alternative to the heat exchange from heat exchangers 119 and 120. In addition, heater 121 is provided to make up for heat losses and the irreversibility of indirect heat exchanges by supplying the balance of heat required to increase the carbonaceous slurry's temperature to a temperature suitable for the slurry carbonization reactions. In the heater 121 the requisite heat is transferred indirectly, as with steam (including steam mixed with gas from wet oxidation of the soluble organic component of the purge, as shown in and described in conjunction with FIG. 2), a heat transfer fluid such as Dowtherm, a fired heater, electric resistance elements, a coil heated by hot flue gas or turbine exhaust, and/or another suitable heat source. Alternatively, heat can be supplied directly to the carbonaceous slurry in heater 121 by injecting high pressure steam (including steam resulting from wet oxidation of the purge, as in FIG. 2), injecting hot flue gas from a pressurized burner, and/or injecting a small amount of air or oxygen-containing gas.

Depending upon the physical arrangement, piping between the heater 121 and the hot side inlet of the heat exchanger 120 may provide sufficient time for the slurry carbonization reactions to be complete. If a particular carbonaceous slurry requires more time at the elevated temperature than so provided, an enlarged section, or reactor, 122 may be inserted to provide additional reaction time. As an alternative and/or supplement to the energy input to the carbonaceous slurry by heater 121, the reactor 122 may be jacketed and heated indirectly by hot fluids, or hot fluids may be injected into the reactor with the hot carbonaceous slurry to provide addition heat energy (not shown). Moreover, a line 147 can be provided to remove the generated carbonization gas from the reactor as formed so that the equilibrium of the slurry carbonization reactions can be shifted in favor of more char product. The gas removed via line 147 is hot and contains considerable steam. In the interest of heat economy, much of this chemical, sensible, and latent heat will usually be recovered, as by means of a heat exchanger or exchangers (not shown), or by direct contact with carbonaceous slurry as in the mixer 111.

As an alternative and/or supplemental to the addition of alkali via the line 109, alkali may be injected into the line leaving the reaction section 122 by means of a connector 124, or into the line entering the reactor 122 (not shown).

Now much reduced in viscosity, the dilute char slurry and gas evolved by carbonization reactions (or as modified by the injection of a heating agent) flow through the line 123 to the hot side of the high temperature heat exchanger 120, in which they supply heat indirectly to the carbonaceous slurry which has been partially heated in the low temperature exchanger 119. Cooled by the heat transfer in the exchanger 120, the char slurry and carbonization gas flow via a line 125 to the hot side of the low temperature exchanger 119. Moreover, the cooled char slurry from exchanger 119 can be further cooled (also as an alternative to cooling in heat exchangers 119 and 120) by indirect heat exchange and/or direct contact with water, air, and/or another colder fluid (not shown). As an alternative and/or supplemental to the addition of alkali via line 109 and/or line 124, it can also be injected into line 125 by means of a connection 126.

Cooled to a suitable temperature in the heat exchanger 119, the char slurry, along with carbonization gas, flows via a line 127 to a pressure reducing device 128, which reduces the pressure of the mixture. Device 128 can also function as a char particle size reducer, utilizing the kinetic energy generated during expansion of the char slurry. The reduction in pressure expands the volume of carbonization gas and increases the steam of saturation, with water vaporized from the slurry, as the mixture flows to a gas-slurry separator 129. In the separator 129, gas and steam are separated and flow, as previously described, via the line 112 to the mixer 111.

Dilute char slurry flows from the separator 129 through a line 130 to a char concentrating device 131. Concentrator 131 is illustrated as a centrifuge but it can be an evaporator, filter, or other suitable device that separates slurry water, which leaves it by means of a line 132, from wet char, which is discharged into a conduit 133. Concentrator 131 may be equipped to wash the wet char with clean and/or recycle water from a line 134 before discharge, the washings joining with the recycle water in line 132.

Recycle water, including washings, is accumulated in a recycle drum 135 from which it is pumped by a secondary recycle water pump 136 via a line 137 to the slurry preparation section 103. However, it is normally necessary to withdraw a solution purge, as through a flow control device 138, to avoid excessive buildup of soluble and suspended compounds. This purge can be treated before discharge by methods known in the water treatment art or as described in U.S. Pat. No. 4,898,107. Alternatively, the purge can be separated from hot char slurry in the line 123, as described in conjunction with FIG. 2, and wet oxidized to provide high pressure steam to supply heat for heater 121, either directly or indirectly, and to eliminate salts as brine. As another alternative, the recycled water in line 137 may be treated by conventional waste water treatment methods to remove or reduce the dissolved and suspended materials (not shown), before reuse in section 103.

Wet char dropping through the conduit 133 is mixed with clean and/or recycled water from the line 134 in a mixer 139, the proportions being regulated to produce a char slurry product of specified viscosity. The product fuel flows through a line 140 to a particle sizing device 141, in which particles larger than a predetermined diameter are separated and flow (if necessary with the aid of water) via a conduit 142 to a size reduction device 143, from which the slurry of reduced-size particles are returned to the device 141 by means of a recycle slurry pump 144. By means of this size-reducing circuit, the maximum size of char particles in the slurry is brought within a predetermined size range and the slurry is discharged via a conduit 145 to a product storage tank 146, in which it is accumulated for the intended use or sale. The tank 146 is preferably equipped with a mixer or mixers, or recirculation to maintain its contents in a uniform condition (not shown). If desired, a high rank coal, Orimulsion, and/or other fossil fuel (dry, semi-solid, and/or slurry already of satisfactory energy density), including liquid fuels such as diesel oil, for example, can be blended with the product char slurry, as in the tank 146, while it bypasses the slurry carbonization circuit.

The product char slurry is stored in tank 146 for later use, either on-site, or by transporting it via a pipeline, truck, ship or the like 150 to a point of use 152 such as a power plant or a char particle processing plant.

The just described particle sizing may, in some cases, be combined in a single powered comminuting device which both prevents the passage of oversize particles and reduces their size to specification. On the other hand, a regrinding of selected size ranges may at times be justified to secure an optimum particle size distribution permitting maximum solids loading and yielding maximum energy density at the specified viscosity.

Although already reduced in inorganic impurities because of the density separations performed in the section 103, the drastic particle size reduction resulting from the slurry carbonization reactions and/or subsequent mechanical comminution may, in some cases, free additional inorganic material which can be separated (by virtue of its density, other physical, and/or chemical properties), at any point downstream of the reactor 122 and preferably upstream of separating device 131, with a hydroclone, air flotation, or another device of the type conventionally employed for "de-gritting".

Should the char slurry be free of large particles likely to congest downstream equipment, the particle sizing circuit 141-144 may be omitted. If the raw feed does not contain significant amounts of extractable anions or cations, the char slurry may merely be concentrated in the device 131 to the desired viscosity, rather than separated essentially completely and reslurried in clean water. Alternatively, the particle sizing circuit 141-144 may be positioned upstream of the char concentrating device 131.

EXAMPLE 1

In accordance with the embodiment of the invention illustrated in FIG. 1, densified RDF, produced in a dry resource recovery facility at Thief Rivers Falls, Minn., was shredded to a ⅛ inch (0.3 cm) particle size, mixed with sodium hydroxide, and slurried with water to a 7.2 wt. % concentration with an apparent viscosity of 300 cP (100 Hz decreasing). The feed RDF slurry had a higher heating value of 560 Btu/lb slurry (310 Kcal/kg slurry), with a dry basis oxygen content of 36.2 wt. %.

The feed RDF slurry was pressurized and charged to a continuous 625 lb/hr (285 kg/hr) pilot plant using a centrifugal and hose diaphragm pump. The slurry was preheated with three electric Dowtherm fluid heaters and its pressure and temperature maintained in a reactor. From the reactor, the char slurry was cooled and depressurized by flashing to atmospheric pressure. The flashed steam and gas was further cooled in a water cooled condenser, with noncondensable gas flared and condensate pumped to a storage tank. The depressurized char slurry was dewatered in a filter press and its particle size reduced in an attritor.

The pilot plant test conditions obtained a char product that was reconstituted with water to 51.8 wt. % total solids, having an apparent viscosity of 500 cP (100 Hz decreasing), a heating value of 6,600 Btu/lb slurry (3,670 Kcal/kg slurry), and a dry basis oxygen content of 13.9 wt. %. Simultaneously, these test conditions obtained a chlorine extraction exceeding 94%, which was increased further by washing in the filter press. In addition, nitrogen, sulfur, titanium, calcium, sodium, potassium and the trace metals mercury, antimony, arsenic, cadmium, lead, cobalt, copper, manganese, and zinc that were analyzed for were significantly reduced in the char product.

Based upon these test results, operation of a 500 Ton/Day of MSW (as received basis) facility, corresponding to the FIG. 1 embodiment of the invention, was computer simulated. Equipment was sized and cost estimated according to established practice. Installation costs were similarly computed. A total capital cost of $36.9 million was calculated for the integrated system with wet resource recovery, including a 15% contingency provision. First year operating and maintenance cost was estimated to be $11.4 million, including capital financing, debt service and depreciation. This corresponds to $69/Ton of MSW, without credit for the sale of recovered recyclables or the product fuel slurry. Assuming the fuel to have a sale value of $1.95/million Btu, the net operating cost is reduced to $42/Ton MSW.

Details of the pilot plant experiments and commercial simulations have been reported to the U.S. EPA in a final report entitled "Innovative Technology for Municipal Solid Waste Disposal and Landfill Mining".

Figure 2:
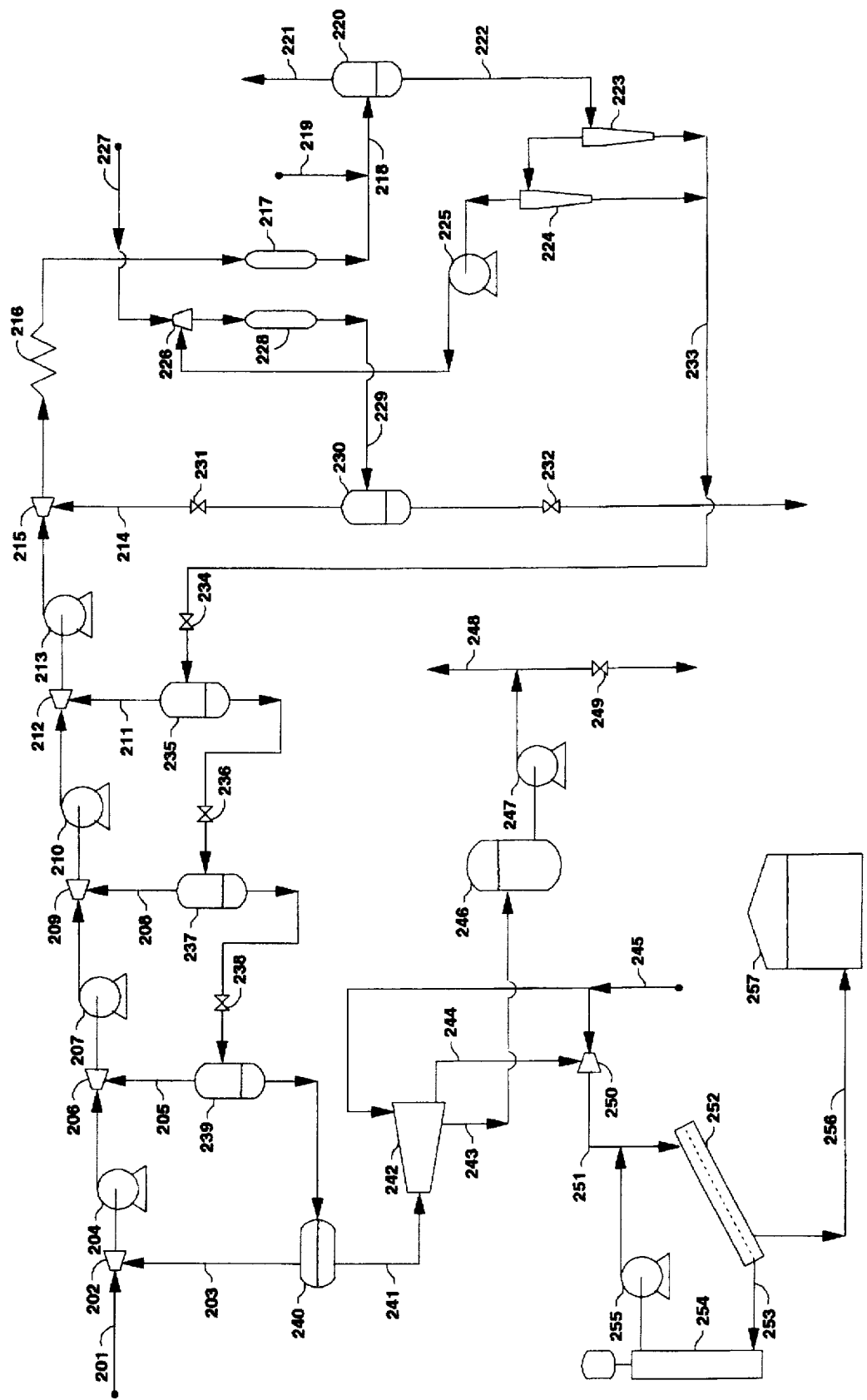
FIG. 2 is a schematic diagram of an embodiment in which dilute slurried low rank coals and/or carbonaceous wastes are pressurized and directly preheated in stages with steam, flashed in corresponding stages from the char slurry product, and converted into a high energy density, low-chlorine char slurry fuel.

FIG. 2 illustrates another embodiment of the invention with respect to processing low rank coals and/or carbonaceous waste. It employs some of the features shown in and described in conjunction with FIG. 1. The preparation steps of FIG. 1 include the addition of alkali or solubilizing agents, removal of inorganics, adjustment of water content, reduction of particle size, and/or blending of carbonaceous wastes, low rank coals, other fossil fuels, and mixtures thereof.

Referring now to FIG. 2, the prepared and viscous carbonaceous slurry is charged to the apparatus through a line 201. The carbonaceous slurry flows to a gas-slurry mixer 202, in which it is contacted with steam-gas mixture from a line 203, and/or other hot fluids (not shown). The steam-gas mixture transfers heat directly to the slurry, increasing its temperature. The preheated slurry flows to a first-stage liquid pressurizing device 204. The device 204 raises the pressure of the slurry to sufficiently below that of flash steam-gas in a line 205 that the two streams may join in a second mixer 206. Any noncondensing gases and condensing steam dilute and raise the temperature of the slurry, which flows to a second pressurizing device 207. The device 207 further increases the pressure of the slurry to sufficiently below that of flash steam-gas in a line 208 that the two streams may join in a third mixer 209. Any noncondensing gases and condensing steam further dilute and raise the temperature of the slurry, which flows to a third pressurizing device 210. The device 210 further increases the pressure of the slurry to sufficiently below that of flash steam-gas in a line 211 that the two streams may join in a fourth mixer 212. Any noncondensing gases and condensing steam further dilute and raise the temperature of the slurry, which flows to a fourth pressurizing device 213. The device 213 further increases the pressure of the slurry to sufficiently below that of flash steam-gas in a line 214 that the two streams may join in a fifth mixer 215. Any noncondensing gases and the steam condensing in the mixer 215 further dilute and raise the temperature of the slurry to that desired for the slurry carbonization reactions.

The hot carbonaceous slurry flows from the mixer 215 to a heater 216, provided to supplement or as an alternative to the direct heating from devices 202 through 215. In the heater 216 the requisite heat is transferred indirectly, as by steam from an external source, a heat transfer fluid such as Dowtherm, a fired heater, electric resistance elements, a coil heated by hot flue gas or turbine exhaust, and/or other conventional heat source. Alternatively, heat may be supplied directly to the carbonaceous slurry by the heater 216 through the injection of high pressure steam from an external source, injection of hot flue gas from a pressurized burner, and/or injection of a small amount of air or oxygen-containing gas.

Although the pressurizing devices 204, 207, 210 and 213 are described and illustrated as discreet, two or more of them may comprise separate parts of a single device and/or be driven by a common power source. Moreover, the apparatus may consist of more or less than the four pressurizing devices described and illustrated. The pressurizing devices may be selected from pumps, extruders, screws, other conventional pressurizing devices, or combinations thereof.

The uncondensed gases may be separated and removed from the main flow immediately after the mixers 202, 206, 209, 212 and/or 215 (not shown). The removed noncondensing gases can be conducted to a furnace, boiler flare, and/or other device to utilize any remaining chemical, sensible and/or latent heat therein (not shown). In addition, the heated slurry can be partially dewatered to a processable viscosity (not shown) between pressurizing devices 204 and 215. The removed moisture is then conducted to a device to utilize sensible heat and/or it is recycled to the preparation section (not shown).

Depending upon the physical arrangement, piping between heater 216 and the gas-slurry separator 220 may provide sufficient time to complete the slurry carbonization reactions. If a particular carbonaceous slurry requires more time at the elevated temperature than so provided, an enlarged section or reactor 217 is inserted to provide the additional reaction time. The reactor 217 may be equipped to separate carbonization gas as evolved, removing it via a line (not shown). As an alternative and/or supplement to heater 216, the reactor 217 may be jacketed and heated indirectly with hot fluids, or hot fluid may be injected into the reactor holding the hot carbonaceous slurry to provide additional heat energy (not shown).

With some easily hydrolyzed carbonaceous wastes, alkali added prior to slurry carbonization results in an increase of soluble organic products at the expense of solid char, so that it may be preferable to decrease or eliminate the alkali addition in the preparation section, and neutralize acidic products at one or more points subsequent or during slurry carbonization. As slurry carbonization products leave the reactor 217 via the line 218, an alternative connection 219 permits the injection of alkali solution or slurry, or alkali may be injected into the line entering the reactor 217 (not shown).

Line 218 discharges into a gas-liquid separator 220, which is illustrated as but is not necessarily a flash tank type. In the separator 220, gases formed in the slurry carbonization, and including gases injected (and/or formed by wet oxidation of soluble organic products, as subsequently described), are separated and discharged from the apparatus through a line 221. The gas in the line 221 is hot and contains considerable steam. In the interest of heat economy much of this chemical, sensible, and latent heat will usually be recovered, as by means of a heat exchanger or exchangers (not shown), or by direct contact with carbonaceous slurry as in line 201 (not shown). Steam condensable from this stream represents a potentially valuable source of relatively pure water.

The char slurry, from the separator 220, flows via a line 222 to the first-stage liquid-solid separator 223, from which the overflow flows to a second-stage liquid-solid separator 224. The separators 223 and 224 are illustrated as but are not necessarily of the hydroclone type. The number of stages as well as the flow arrangement between stages can of course be modified as needed. To the maximum extent possible, solid char is discharged, along with net and recycled water (which may contain dissolved gases), as the combined under-flow of the separators 223 and 224, which are operated to take as net overflow the portion of aqueous liquid from the separator 220 corresponding to a purge of soluble organic and inorganic compounds.

There is a further reason to take the purge as an overflow of separating devices based upon density differentials. In spite of careful attention to conditions maximizing the yield of solid char and limiting (so far as possible) gas production to carbon dioxide, slurry carbonization is a form of pyrolysis which can result in a minor yield of oil and/or tar. Moreover, a few particularly stable polymers may resist decomposition and remain (but be liquid at the temperature). These insoluble, relatively high-melting materials can cause plugging in downstream equipment as the product is cooled. But, being less dense than water, they accompany the purge and are sent, along with water and soluble organics, to be destroyed by wet oxidation, furnishing useful heat in the process.

The pressure of the overflow from the separator 224 is increased by a pump 225 which discharges the purge stream to a mixer 226, where it is mixed with compressed oxygen-containing gas from a line 227, and, to the extent possible, oxidizes organics in the overflow to carbon dioxide and water. An enlarged section, or reactor, 228 is inserted to provide sufficient time for the desired level of oxidation. The oxidation releases sufficient heat to raise the temperature of the mixture so that some of its water is converted to steam.

The mixture of hot steam, gases, and water, in which the inorganic compounds are dissolved and/or slurried (brine), flows via a line 229 to a steam-brine separator 230. In separator 230, which is illustrated as but is not necessarily a flash tank, steam and gases are separated and leave via a pressure control device 231 and a line 214 to join and heat preheated slurry (as previously described) in the mixer 215. Brine separated in the separator 230 leaves the process through a pressure reducing device 232. It, too, contains considerable high level heat which should be recovered in appropriate heat transfer equipment and treated for discharge.

If the oxidant injected from line 227 is air, the vapor phase leaving the separator 230 will contain appreciable nitrogen, which will accompany the fully heated slurry through the reactor 217 to the separator 220. The partial pressure of this nitrogen, added to that of the generated oxidation and slurry carbonization gases, requires that pressure appreciably higher than the saturation pressure of water be maintained between the pressuring device 213 to the separators 220 and 230. Moreover, the loss of heat as steam of saturation of the gases will be greater than if the oxidant is commercial oxygen. The choice of oxidant will usually be determined by local economics, particularly the price of purchased oxygen.

The under-flow of the hydroclones 223 and 224 flows via a line 233 to a pressure reducing device 234. The decrease in pressure through the device 234 causes part of the char slurry water (and possibly dissolved gases) to flash into steam and gases as the mixture flows into a first-stage char slurry separator 235. In the separator 235, steam is separated from liquid slurry and flows through the line 211 to the mixer 212, as previously described. The slurry, partially cooled and concentrated by the flashing of part of its water, flows from the bottom of the separator 235 to a second pressure reducing device 236.

The decrease in pressure through the device 236 causes another part of the char slurry water (and possibly dissolved gases) to flash into steam and gases as the mixture flows into a second-stage char slurry separator 237. In the separator 237, steam is separated from liquid slurry and flows through the line 208 to the mixer 209, as previously described. The slurry, partially cooled and concentrated by the flashing of part of its water, flows from the bottom of the separator 237 to a third pressure reducing device 238.

The decrease in pressure through the device 238 causes another part of the char slurry water (and possibly dissolved gases) to flash into steam as the mixture flows into a third-stage char slurry separator 239. In the separator 239, steam is separated from liquid slurry and flows through the line 205 to the mixer 206, as previously described. The slurry, now cooled to only slightly above its atmospheric boiling point and concentrated by the flashing of part of its water, flows from the bottom of the separator 239 to an accumulator 240, from which a further small amount of steam is released, cooling the char slurry to its atmospheric boiling point. The steam from the accumulator 240 may be conducted by a line 203 to be mixed in incoming carbonaceous slurry via the line 201 to the mixer 202, as previously described.

The char slurry separators 235, 237 and 239 are shown as but are not necessarily a flash tank. Their bottom connections may be equipped with seal pots (not shown) to maintain an appropriate slurry level and prevent steam from exiting in this direction.

Although considerable moisture and dissolved compounds have been removed from the char slurry in devices 223, 224, 235, 237, 239, and 240, it may be necessary to further concentrate the char slurry to the desired viscosity. If so, the dilute char slurry flows from the separator 240 through a line 241 to a char concentrating device 242. The device 242 is illustrated as a centrifuge but it can be an evaporator, filter, or other conventional device that separates slurry water, which leaves it by means of a line 243, from wet char, which is discharged into a conduit 244. The device 242 may be equipped to wash the wet char with clean and/or recycled water from a line 245 before discharge, the washings joining with the recycle water in the line 243.

Recycle water, including washings, is accumulated in a recycle drum 246 from which it is pumped by a secondary recycle water pump 247 via a line 248 to the slurry preparation section or recycle water treatment (not shown). It may be necessary to withdraw a solution purge, as through a flow control device 249, in addition to the brine slurry removed through device 232, to control water inventory and/or avoid an excessive buildup of soluble and suspended compounds. This purge may be treated before discharge in a manner well known in the water treatment art or as described in U.S. Pat. No. 4,898,107. The recycled water from the line 248 may be treated by conventional waste water treatment methods to remove or reduce the dissolved and suspended materials, prior to reuse in the preparation section (not shown).

Wet char dropping through the conduit 244 is mixed with clean and/or recycled water from the line 245 in a mixer 250, the proportions being regulated to produce a char slurry product of specified viscosity. The expansion and high velocities resulting from the operation of the devices 233, 235 and 237 causes considerable fragmentation of particles. Nevertheless, it may be necessary to provide additional particle size reduction. If so, the product fuel flows through a line 251 to a particle sizing device 252, in which particles larger than a predetermined size are separated and flow (if necessary with the aid of water) via a conduit 253 to a size reduction device 254, from which the slurry of reduced-size particles is returned to the device 252 by means of a recycle slurry pump 255. By means of this size-reducing circuit, the maximum size of char particles in the slurry is kept within the predetermined range and it is discharged via the conduit 256 to a product storage tank 257, in which it is accumulated for the intended use or sale. The tank 257 may be equipped with a mixer or mixers, or its content can be recirculated to maintain it in a uniform condition (not shown). If it is desired to blend a high rank coal, Orimulsion, and/or other fossil fuel (dry, semi-solid, and/or as a slurry already of satisfactory energy density), it is possible to bypass slurry carbonization and blend it with the product char slurry, as in the tank 257.

The above-described particle sizing devices shown in FIG. 2 (reference numerals 252–255) may, in some cases, be combined in a single powered comminuting device which both prevents the passage of oversize particles and reduces their size to specification. On the other hand, a regrinding of selected size ranges may at times be justified to secure an optimum particle size distribution permitting maximum solids loading and yielding maximum energy density at the specified viscosity.

Although already reduced in inorganic impurities because of the density separations performed in the preparation section (not shown), the drastic particle size reduction resulting from the slurry carbonization reaction and/or subsequent mechanical comminution may, in some cases, free additional inorganic material which can be separated (by virtue of its density, other physical, and/or chemical properties), at any point downstream of reactor 217 and preferably upstream of the separating device 242, with air flotation or another device such as a hydroclone of the type conventionally employed for "de-gritting".

Should the char slurry be free of large particles likely to congest or plug downstream equipment, the particle sizing circuit 252–255 may be omitted. If the raw feed does not contain significant amounts of extractable anions or cations, the char slurry may merely be concentrated in the device 242 to the desired viscosity, rather than separated essentially completely and reslurried in clean water. Alternatively, the particle sizing circuit 252–255 may be positioned upstream of the char concentrating device 242.

For simplicity of illustration and explanation, FIG. 2 shows three stages of char slurry pressure reduction. The more stages into which the overall pressure reduction is divided, the nearer the system comes to ideal (reversible) heat exchange, and the less heat is needed from the oxidation occurring in reactor 228 and/or heater 216. The heat of oxidation depends upon the production of water soluble organic compounds, functions of feed stock, carbonization temperature and time, and the selection and point of addition of alkali. In general, one should seek to maximize the production of solid char which equates with minimizing production of soluble organics. The lower the yield of soluble organics, the larger the number of flash stages are required to internally heat balance the system (without the assistance of heater 216). This number may often be more than three. The heat available from the oxidation may also be adjusted by regulating its pressure. Higher pressures result in an increase in water rejected as brine (less converted to steam). Although ideally the water in brine discharged is just sufficient to ensure that it flows freely from the process, it may be necessary to reject more water to maintain a heat and/or water balance. Another means of regulation is by varying the purge rate, i.e., the proportion of flow taken as hydroclone overflow to the pump 225. Lower rates of purge result in higher concentrations of organics and salts, and vice versa.

The carbonaceous slurry in line 201 has been described as viscous. Since viscosity is a function of concentration, it is a measure of how much water has to be heated to carbonization temperature and cooled down again—in other words, how much heat has to be transferred. In an embodiment, such as FIG. 1, in which most of this transfer takes place through heat exchangers, viscosity is an important factor determining heat transfer rate, and therefore, the amount of heat transfer surface required. The amount and cost of such a surface mount rapidly as viscosity increases. Opposing factors must be balanced: the higher the viscosity, the lower the duty but the poorer the heat transfer rate (and possibly the greater the tendency toward fouling). Accordingly, the charge viscosity is largely a matter of economics.

The embodiment shown in FIG. 2 accomplishes the in/out, heating/cooling duty without heat exchangers, thus avoiding an important viscosity restraint affecting the embodiment of FIG. 1. With the FIG. 2 embodiment, it becomes feasible to charge a more concentrated slurry to the slurry carbonization, which may have the consistency of a paste or sludge. It is notable that, during the heating, viscosity is repeatedly lowered by temperature and dilution, and by the slurry carbonization reactions themselves. The most economic charge viscosity (concentration) will therefore frequently be higher, although this is not necessarily always so. Factors to be considered include: heating/cooling duty itself is not as cost-significant when it is accomplished by merely moving water and steam around, and hydroclones are more effective at relatively low viscosities.

EXAMPLE 2

In a second computer simulation based upon the pilot plant results reported Example 1, a 500 Ton/Day of MSW (as received basis) facility, corresponding to the embodiment of the invention illustrated in FIG. 2, was computer simulated. Equipment was sized and cost estimated according to established practice. Installation costs were similarly computed. A total capital cost of $29.5 million was calculated for the integrated system with wet resource recovery, including a 15% contingency provision. First year operating and maintenance cost was estimated to be $10.5 million, including capital financing, debt service and depreciation. This corresponds to $63/Ton of MSW, without credit for the sale of recovered recyclables or the product fuel slurry. Assuming the fuel to have a sale value of $1.95/million Btu, the net operating cost is reduced to $36/Ton MSW.

Details of the pilot plant experiments and commercial simulations have been reported to the U.S. EPA in a final report entitled "Innovative Technology for Municipal Solid Waste Disposal and Landfill Mining".

Figure 3:
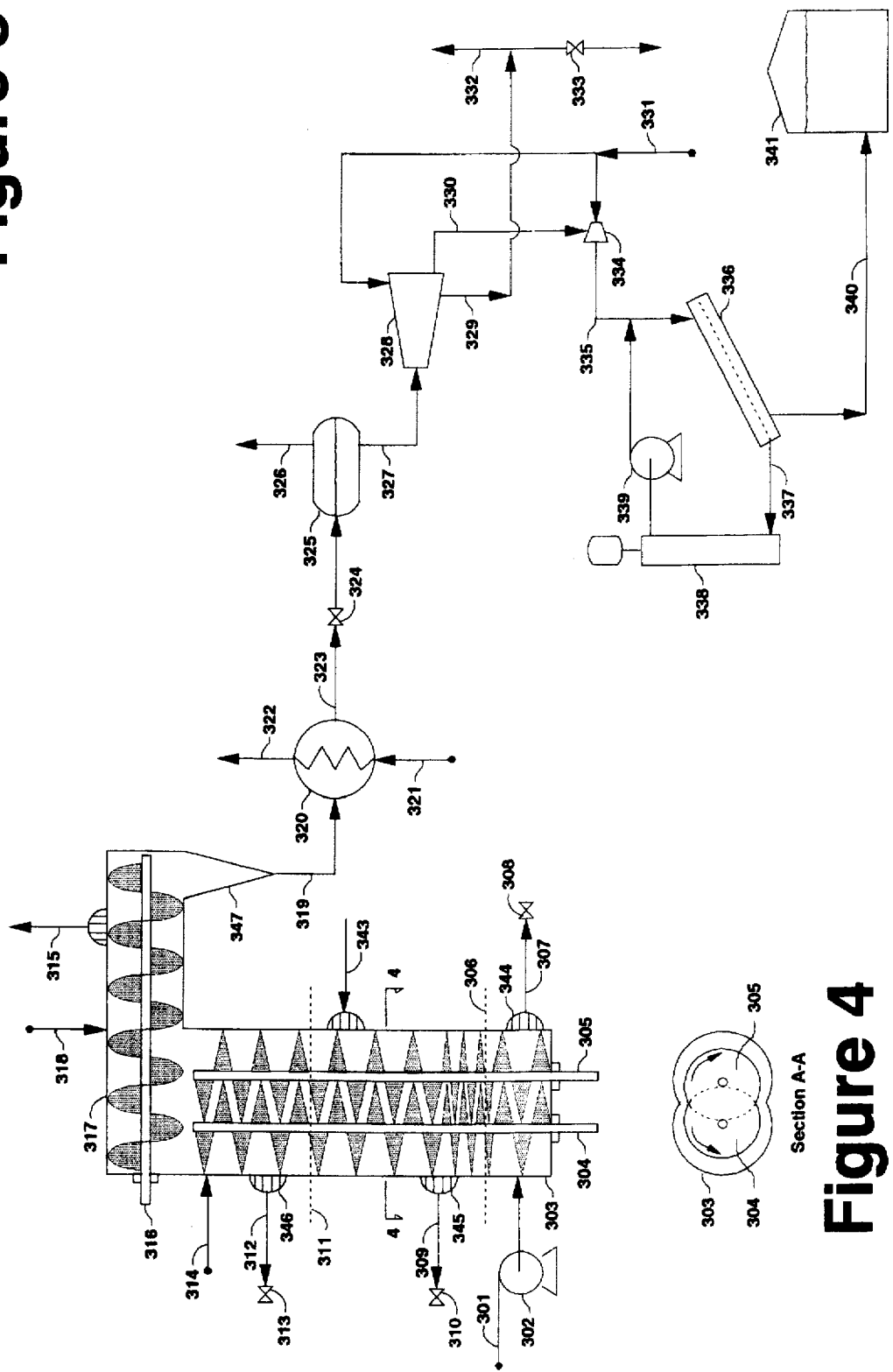
FIG. 3 is a schematic diagram of an embodiment in which viscous slurried low rank coals and/or carbonaceous wastes are pressurized, heated, and conveyed in a dual mechanical screw reactor with counter current flow of fluid and carbonaceous solids, and converted into a high energy density, low-chlorine char slurry fuel.

FIG. 3 illustrates another embodiment of the invention which minimizes slurry heating/cooling duty and accomplishes the transfer directly; i.e. without a heat transfer surface. It employs some of the features shown in and described in conjunction with FIG. 1. The preparation steps of FIG. 1 include the addition of alkali or solubilizing agents, removal of inorganics, adjustment of water content, reduction of particle size, and/or blending of carbonaceous wastes, low rank coals, other fossil fuels, and mixtures thereof. In its simplest concept, the embodiment of FIG. 3 moves carbonaceous solids against a fluid pressure gradient using mechanical screws, wherein the heat content of a hot fluid, in direct contact with the carbonaceous solids, is transferred to the latter, thereby causing the desired heating and resulting slurry carbonization reactions.

Figure 4:
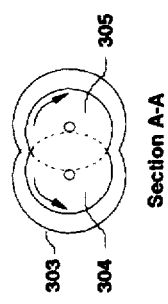
FIG. 4 is a schematic, cross-sectional plan view taken along line 4—4 of FIG. 3.

Referring now to FIG. 3, the prepared and viscous carbonaceous slurry is continuously charged to the apparatus through a line 301, and pressurized to the selected operating pressure by the pressurizing device 302. The pressurizing device may be a pump, screw, extruder, another conventional pressuring device, or a combination thereof. From the pressurizing device 302, the pressurized viscous slurry flows to a pressurized vessel or reactor 303, which contains two vertical rotating screws 304 and 305. The screws 304 and 305 are counter rotating screws, shaped to restrict fluid flow between each screw and the adjacent vessel wall. The screws 304 and 305 are centered within the vessel 303 so that the edge of each screw blade almost touches the core of the other screw. The screws rotate in unison so that the closed volumes formed between the screw flites travel toward the higher fluid pressure end of the vessel 303. The vessel 303 is shaped as two concentric cylinders around the screws 304 and 305, such that there is a minimal clearance between the screw flites and vessel wall. Vessel 303 and screws 304, 305 are shown in FIG. 4.

As previously discussed, in order for the carbonaceous slurry to be charged to the vessel 303 via the line 301, it must be sufficiently dilute to be efficiently pressurized. Once pressurized by the device 302 and conveyed to the vessel 303, the dilute slurry is thickened by removing most of the transporting water through screen 344. Pressure control valve 308 is operated to allow a sufficient differential pressure to occur across screen 344 so that the transport water is removed without reducing the pressure in vessel 303. The flow of transport water through screen 344 causes the carbonaceous solids in the slurry to concentrate on the upstream side of the screen, where they are progressively transported upward by the rotation of screw flites 304 and 305.

Dashed line 306 indicates a cross-section in vessel 303 where there is no or minimal downward flow of fluid counter current to the upward flow of concentrated slurry. This concentration of the slurry can be achieved by providing a section below this line where the screw flites pitch is made progressively shorter so that the slurry is squeezed by mechanical action as it is forced upward by the rotating screws. This densely packed slurry essentially prevents downward fluid flow at this cross-section of the vessel 303. Above cross-section 306, the screw flites have a larger pitch so that the mechanical pressure on the carbonaceous solids portion of the upwardly conveyed slurry is relaxed, allowing the slurry to regain fluid. This more dilute slurry allows the fluid pressure gradient to cause a downward flow of fluid, counter current to the upward conveyed solids. Since this downward flowing fluid cannot flow below section 306, it must exit the vessel through filter screen 345 and out through line 309. Control valve 310 is actuated to remove only enough water to maintain operating pressure in vessel 303.

The carbonaceous solids are allowed to regain some water above the reference line 306, and its concentration is lowered so that hot water can again flow downward. As the carbonaceous solids are conveyed up vessel 303 by the screws 304 and 305, they are contacted by hot water flowing downward, are heated to the desired slurry carbonization temperature, and approach the temperature of the hot water flowing downward. The volume of the vessel and the rotational speed of the screws are selected to provide sufficient time to essentially complete this direct heat transfer.

In spite of careful attention to conditions, slurry carbonization is a form of pyrolysis which can generate a small amount of oil and/or tar. These tars and/or oils are relatively high-melting materials which can plug downstream equipment as the downward flowing water is cooled, and they represent a potential recycle water treatment cost. To prevent this, the downward flow of hot water, below the reference line 311, can be restricted by changing the pitch on screws 304 and 305 so that a portion or significant percentage of the hot water is removed via a line 312. A pressure control device 313 regulates the flow rate of the hot water in line 312 and regulates the system pressure of the vessel 303 above reference line 311. A third filter screen 346 between the screws 304 and 305 and the vessel 303 prevents carbonaceous solids from exiting the vessel 303 with the hot water. The filter screen is scraped by the flites of the screws 304 and 305 to prevent buildup of carbonaceous solids on the filter screen. A portion of the slurry water removed via line 312 may be purged and/or treated to remove and/or destroy the generated tars and/or oils by conventional methods and/or wet oxidation as described in conjunction with FIG. 2. If necessary, the removed and treated hot water, at the appropriate temperature, may be reinjected into the vessel 303 via a line 343, at a point below reference line 311, to provide sufficient heat, carbonaceous solid concentration, and downward water flow.

Above reference line 311, the carbonaceous solids are allowed to regain some water and its concentration is lowered so that again hot water can flow downward. To make up for heat losses and the irreversibility of heat exchange, hot water, high pressure steam, or other hot fluids are injected through a line 314. Moreover, vessel 303 may be jacketed and heated indirectly by hot fluids to supplement and/or as an alternative to the energy input through line 314 (not shown).

The behavior of the carbonaceous slurry when placed in the twin screw vessel will depend both upon the dimensions of the vessel 303 and the screws 304 and 305, as well as upon the physical characteristics of the carbonaceous solids and slurry fluid. If there is essentially no clearance between the screws 304 and 305 and the vessel wall and the slurry is extremely concentrated, the device will act as an extruder and all material will be transported in the direction the screw cavities travel. If there are wide clearances between the screws and the vessel wall and the slurry is dilute, the device will mix the slurry as it flows opposite to the direction the screw cavities travel. Between these two opposite actions, there exists a region of physical dimensions of the apparatus that in combination with certain slurry characteristics will result in the desired action of counter current fluid and carbonaceous solids flow. The desired counter current action will occur when the combined physical dimensions and slurry characteristics provide a continuous column of wet carbonaceous solids through the vessel, along with sufficient mechanical restrictions to prevent back-flow of the wet carbonaceous solids, and the mechanical force pressing on the solids remains below the "break point" where the applied mechanical force (usually less than 100 psig as measured by the fluid pressure) is in proportion, not exponential, to the water removed.

The vertical counter rotating screw column is operated so that the upwardly conveyed solids reach the desired slurry carbonization temperature at the upper end of the vessel 303. A power driven horizontal rotating screw 316 conveys the carbonaceous solids and some water, previously conveyed upwards by screws 304 and 305, into vessel 317 (which is at essentially the same pressure as vessel 303) towards vessel discharge 347. The volume of vessel 317 and the rotational speed of screw 316 are such that sufficient time is provided to complete the desired slurry carbonization reactions. To make up for heat losses and/or supplement the heat input through line 314 into vessel 303, hot water and/or high pressure steam can be injected through a line 318 into horizontal vessel 317. Moreover, vessel 317 may be jacketed and heated indirectly by hot fluids (not shown). Under certain conditions of slurry carbonization temperature, pressure and feed material, it may be advantageous to remove all or part of the carbonization gas and steam from the horizontal vessel through a line 315.

With some easily hydrolyzed carbonaceous wastes, alkali added prior to slurry carbonization results in an increase of soluble organic products at the expense of solid char, so that it may be preferable to decrease or eliminate the alkali addition in the preparation section, and neutralize acidic products at one or more points subsequent or during slurry carbonization (not shown).

From the vessel 317, the char slurry flows via the line 319 to the cold side of an indirect heat exchanger 320 where it is indirectly cooled by and to a temperature approaching the temperature of feed water, air, or another cold fluid from a line 321. This fluid is heated to a temperature approaching the temperature of the char slurry and flows via a line 322 to be further heated (not shown) for use as the hot water, high pressure steam, and or/other fluid to be injected into vessel 317 via line 318, and/or into the vessel 303 via line 314. The heat exchanger 320 may be a single unit or multiple heat exchange units arranged in series and/or parallel.

Cooled to a suitable temperature in heat exchanger 320, the char slurry along with carbonization gas flows via a line 323 to a pressure reduction device 324 which reduces the pressure of the mixture. The device 324 may also function as a char particle size reducer, utilizing the kinetic energy generated during expansion of the char slurry. The reduction in pressure expands the volume of carbonization gas and increases the steam of saturation, with water vaporized from the slurry, as the mixture flows to a gas-slurry separator 325, where gas and steam are separated and discharged via a line 326. The discharge gas, while mainly carbon dioxide, has a heating value and will normally be conducted to a furnace, boiler, or a flare (not shown). Moreover, the gas and remaining steam may be conducted to a device to further utilize sensible and latent heat (not shown).

Although considerable moisture and dissolved compounds have been removed from the carbonaceous and char slurry via the lines 307, 310, 312 and 326, it may be necessary to further concentrate the char slurry to the desired viscosity. If necessary, the dilute char slurry flows from the separator 325 through a line 327 to a char concentrator 328. Concentrator 328 is illustrated as a centrifuge but if desired it can be an evaporator, filter, or another conventional device that separates slurry water. Separated water is discharged into a line 329, while the wet char is discharged into a conduit 330. Concentrator 328 may be equipped to wash the wet char with clean and/or recycle water from a line 331 prior to discharge, the washings being added to the recycle water in line 329.

The removed slurry water flows to the slurry preparation section or recycle water treatment (not shown) via a line 332. It may be necessary to withdraw a solution purge, as through a flow control device 333, in addition to the hot water removed through the line 312, to avoid excessive buildup of soluble and suspended compounds. This purge may be treated before discharge, as is well known in the art or as disclosed in U.S. Pat. No. 4,898,107.

Wet char dropping through conduit 330 is mixed with clean and/or recycled water from a line 331 in a mixer 334, the proportions being regulated to produce a char slurry product having the desired viscosity. The expansion and high velocities resulting from the operation of pressure reducing device 324, and the grinding from the screws 304, 305 and 316, cause considerable fragmentation of particles. Nevertheless, it may be necessary to provide additional particle size reduction. If necessary, the product fuel flows through a line 335 to a particle sizing device 336, in which particles larger than a predetermined size are separated and flow (if necessary with the aid of water) via a conduit 337 to a size reduction device 338, from which a slurry of reduced-size particles is returned to the device 336 by means of a recycle slurry pump 339. This size-reducing circuit brings the maximum size of char particles in the slurry within the desired range and it is discharged via a conduit 340 to a product storage tank 341, in which it is accumulated for the intended use or sale. The tank 341 may be equipped with a mixer or mixers, or with recirculation to maintain its contents in a uniform condition (not shown). If desired, a high rank coal, Orimulsion, and/or other fossil fuel (dry, semi-solid, and/or slurry already of satisfactory energy density) can be blended with the product char slurry in tank 341 by bypassing the slurry carbonization.

The particle sizing circuit 336–339 may, in some cases, be replaced by a single powered comminuting device which both prevents the passage of oversize particles and reduces their size to specification. On the other hand, regrinding of selected size ranges may be justified on the basis of securing an optimum particle size distribution permitting maximum solids loading and energy density at the specified viscosity.

Although already reduced in inorganic impurities because of the density separations performed in the preparation section (not shown), the drastic particle size reduction resulting from the slurry carbonization reaction and/or subsequent mechanical comminution may, in some cases, free additional inorganic material. It can be separated (by virtue of its density, other physical, and/or chemical properties), at any point downstream of vessel 317 and preferably upstream of separating device 328, with a hydroclone, air flotation, or another device of the type conventionally employed for "de-gritting".

Should the char slurry be free of large particles likely to plug downstream equipment, the particle sizing circuit 336–339 may be omitted. If the raw feed does not contain significant amounts of extractable anions or cations, the char slurry may merely be concentrated in the device 328 to the desired viscosity, rather than separated essentially completely and reslurried in clean water. Alternatively, the particle sizing circuit 336–339 may be located upstream of the char concentrating device 328.

The advantage of direct heat transfer over indirect exchange in this case is lower equipment cost due to the elimination of heat transfer surfaces and a decrease in the heat energy needed for steady state operation. One of the advantages of the FIG. 3 embodiment is that the carbonaceous solids content in the heat exchange section of vessel 303 can be maintained at the optimum concentration for efficient transport with very little effect on process heat economy.

As the foregoing discussion of the disclosed embodiments demonstrates, the overall thermal efficiency of fuel combustion depends on several factors, such as fuel moisture, carbon burnout, excess air, flue gas discharge temperature and parasitic losses due to fuel charging, fans, ash handling, the energy consumption (including pressure drop) of air pollution control (APC) devices, and the like. Natural gas has been called the perfect fuel since it contains little if any moisture, carbon burnout is essentially 100% with nominal excess air, flue gas discharge temperature may be lowest, and there are minimal parasitic losses since flue gases are relatively clean (no ash and low $NO_x$ and CO emissions). Ash-free distillate fuel oil is probably second "best". It requires a little more excess air for complete burnout and usually involves slightly higher parasitic losses than natural gas due to the need for a fuel pump. With residual fuel oils, essentially moisture-free, carbon burnout is high with moderate excess air, but soot blowers may be required. Flue gas discharge temperature must usually be above acid dewpoint, particulate control equipment (ESP or baghouse) is required and, depending on sulfur content, lime injection or scrubbing may be required, entailing low-to-moderate parasitic losses.

Coals vary widely in ash, moisture, sulfur and nitrogen contents. In general, they are burned most efficiently by means of pulverized coal (pc-) burners, which obtain good carbon burnout with moderate excess air. Flue gas discharge temperature must be above acid dewpoint. Parasitic losses, which include the pulverizers and APC devices, range from moderate to high, depending upon the extent of impurities. In addition, pc requires longer residence times during combustion, resulting in larger boilers than are needed for natural gas or fuel oil. When coals are burned in a layer on stoked, shaking or moving grates, excess air has to be high to achieve acceptable carbon burnout and parasitic losses are correspondingly higher than with pc-burners.

MSW, mass burned with moving grates or fluidized bed, or as RDF, yields the lowest combustion efficiency. The high and variable moisture content of MSW requires excess air of about 100–150% to achieve acceptable burnout, with considerably higher parasitic losses from shredders, solids conveyors, combustion air fans, baghouses or ESPs, and acid gas, $NO_x$, trace toxic metal, and dioxin APCs. Due to the higher volumes of flue gases for effective carbon burnout and more stringent emission regulations, parasitic losses soar to nearly double those of an equivalent coal-fired boiler.

By means of this invention, MSW and other low grade carbonaceous fuels and wastes are turned into a uniform liquid fuel which can be fired similarly to fuel oil, except that ash handling capacity may have to be increased (although it remains less than with the typical pc or MSW). In addition, the majority of toxic metals and chlorine has been removed from the char slurry, simplifying or even eliminating pollution control systems for these compounds. Reactivity is so high that virtually 100% burnout is obtained with excess air as low as about 15%. In contrast to current practice, no other acid gas nor $NO_x$ APC devices are needed. The only efficiency-reducing factor is a moisture content of about 50%.

To determine the operating performance of the present invention, samples of RDF, lignite coal, and a blend of 50 wt. % lignite coal and 50 wt. % RDF (dry basis) were slurry carbonized in bench-scale and continuous pilot scale equipment, referenced in Examples 1 and 2. Ultimate proportions (wt. % and moisture free), heating value (moisture free and slurry), and rheology characteristics of the raw and resultant char are summarized in Table 1. The lignite and lignite/RDF char were produced with bench-scale equipment, and the RDF char was produced with pilot plant equipment.

TABLE 1

|  | Raw RDF | Raw Lignite | Raw RDF/ Lignite | RDF Char | Lignite Char | Lignite/ RDF Char |
|---|---|---|---|---|---|---|
| Ultimate, wt. % | | | | | | |
| Carbon | 43.3 | 61.9 | 54.8 | 63.2 | 66.0 | 67.4 |
| Hydrogen | 5.4 | 4.5 | 5.6 | 7.6 | 4.6 | 5.8 |
| Nitrogen | 0.2 | 0.9 | 0.6 | 0.3 | 0.9 | 0.8 |
| Sulfur | 0.1 | 1.8 | 1.0 | 0.1 | 1.5 | 1.1 |
| Ash | 15.3 | 10.1 | 8.4 | 17.7 | 10.3 | 9.9 |
| Oxygen | 35.7 | 20.8 | 29.6 | 11.1 | 16.7 | 15.0 |
| Chlorine, µg/g | 3000 | ND | 1500 | 460 | ND | 150 |
| Rheology | | | | | | |
| Visc., cP | 500 | 700 | 500 | 500 | 825 | 815 |
| Wt. % Solids | 9.1 | 36.6 | 22.8 | 51.8 | 55.6 | 56.7 |
| Heating Value (Btu/lb) | | | | | | |
| dry | 7400 | 10940 | 9790 | 12740 | 11690 | 12670 |
| slurry | 670 | 4010 | 2230 | 6600 | 6470 | 7140 |

For each carbonaceous fuel, the oxygen content of the carbonaceous solids was reduced, while the dry heating value in the char product was improved by slurry carbonization. Oxygen was removed from the carbonaceous solids as carbon dioxide gas. With RDF, the oxygen content was reduced 69% (dry basis) and the heating value of the char product was improved 72% (dry basis). In addition, the solids loading of the char slurry was increased to 51.8 wt. %, when processed according to this invention, or by more than 460% from the feed slurry, to produce a char slurry with a heating value of 6,600 Btu/lb (wet basis). The solids loading of the lignite/RDF blend was higher than either component char slurry alone, due to a bi-modal particle size distribution in the blend. In separate experiments to evaluate the effects of grinding wet RDF char, the original product could be reslurried to 49.2 wt. %, whereas grinding permitted a loading of 51.8 wt. % at the same viscosity.

When processed according to this invention, the chlorine concentration of the RDF char was reduced 85% from the raw RDF concentration, with sodium hydroxide (NaOH) added to the feed slurry. With lime (CaO) added to the feed RDF slurry, the chlorine concentration was reduced by 91%. In separate experiments, char product was washed with chlorine free water, and the chlorine content of the char product further reduced. The chlorine content of the lignite/RDF char was lower than the RDF char (with CaO or NaOH added to the feed slurry) due to naturally occurring alkalis in the lignite reacting with the chlorine.

To confirm the quality of slurry fuel resulting from this invention, the char slurry that was produced from pilot plant experiments with RDF, referenced in Examples 1 and 2, was combusted in a 650,000 Btu/hr pc-boiler simulator. In addition, the RDF char produced as above was blended with 7.5% diesel oil and combusted in the same simulator. Moreover, the char slurry produced from lignite coal, RDF, and a blend of 50% lignite coal and 50% RDF (dry basis) was combusted in an experimental pressurized fluidized bed reactor. The combustion conditions and flue gas emissions without any APC systems are summarized in Table 2. The flue gas emissions have been corrected to the established standard of 7% $O_2$, dry basis.

TABLE 2

|  | RDF Char Slurry | RDF Char/ Dsl. Slurry | Lig. Char Slurry | RDF Char Slurry | RDF/Lig. Char Slurry |
|---|---|---|---|---|---|
| Comb. Type | pc-coal | pc-coal | PFBR | PFBR | PFBR |
| CO, ppm | 16.3 | 5.3 | 1.2 | 6.9 | 6.7 |
| $NO_x$, ppm | 82.2 | 211.1 | 121.3 | 90.9 | 91.0 |
| $SO_2$, ppm | 40.4 | 158.4 | 316.6 | 38.1 | 89.4 |
| HCl, ppm | 17.0 | 17.0 | ND | 4.1 | 6.2 |
| Hg, mg/dscm | 0.003 | 0.003 | ND | ND | ND |
| Comb Temp, °F. | 1716 | 1970 | 1551 | 1580 | 1602 |
| Press., psig | 0 | 0 | 153 | 150 | 146 |
| Excess Air, % | 40.3 | 15.0 | 23.3 | 22.2 | 25.9 |
| Carb. Burn., % | 99.9 | 99.9 | 98.5 | 99.0 | 99.5 |

Emissions from combustion of all five slurry fuels were exceptional, even when compared to the New Source Performance Standards for Municipal Waste Combustors (NSPS, published Sep. 20, 1994 in the Federal Register) or the Clean Air Act Amendments of 1990 for coal boilers (CAAA). Carbon Monoxide (CO) emissions, for the RDF char based slurry fuels, were 67 to 96% below the NSPS, even though only 15.0 to 40.3% excess air was used. Low CO emissions were achieved due to the high reactivity (high volatile matter content vs. fixed carbon) of the char slurry, improved uniformity of the char slurry, and improved fuel-air mixing. Nitrogen Oxides ($NO_x$) emissions also were up to 55% lower than the NSPS, without selective noncatalytic or catalytic reduction. Low $NO_x$ emissions were achieved through improved uniformity of the slurry fuels, improved fuel-air mixing, and lean-rich combustion air staging.

Since slurry carbonization extracted a significant weight percentage of chlorine, sulfur, and toxic metal anions/cations, HCl emissions, for the RDF char based slurry fuels, were substantially lower than the NSPS, without acid gas scrubbing. Although the measured $SO_2$ for the RDF char based slurry fuels slightly exceeded NSPS, those regulations are a fraction of the concentration allowed for coal-fired boilers under the CAAA. In addition, the $SO_2$ emissions for the carbonized lignite/RDF slurry blend were 72% lower than the $SO_2$ emissions from the lignite char slurry, both of which comply with Phase II of the CAAA. If not slurry carbonized, $SO_2$ emissions from raw lignite or the raw lignite/RDF blend would not comply with Phase II of the CAAA. Moreover, the mercury (Hg) emissions, for the RDF char based slurry fuels, were over 95% lower than the NSPS, since a significant percentage of the mercury was removed during resource recovery and slurry carbonization.

What is claimed is:

1. A continuously operable method of rendering relatively low grade carbonaceous fuel readily transportable and combustible, comprising the steps of:

forming a fuel slurry including the fuel and a liquid;

pressurizing the fuel slurry to keep it substantially in its liquid state;

heating the fuel slurry to a temperature at which a substantial portion of oxygen chemically bound in molecules of the carbonaceous fuel splits off as carbon dioxide, thereby forming a char slurry including char particles derived from the fuel and an evolved gas; and storing the char slurry for later use.

2. A method according to claim 1 wherein the liquid comprises water and including the steps of removing a major portion of the water in the char slurry, including salts and other undesirable impurities dissolved or suspended in the water, and replacing removed water with water which is substantially free of the salts and the other impurities.

3. A method according to claim 2 wherein the step of replacing comprises adding sufficient water substantially free of the salts and other impurities to provide the char slurry with a char particle content of at least about 49% by weight.

4. A method according to claim 1 wherein the fuel slurry and the char slurry each include water, and including the step of lowering the amount of water in the char slurry as compared to the amount of water in the fuel slurry.

5. A method according to claim 4 wherein the step of lowering comprises removing a portion of the water in the char slurry as steam.

6. A method according to claim 1 wherein the fuel slurry includes halogens, and including the step of adjusting an alkali content to at least equal a chemical equivalent of the halogen content so that soluble halogen salts are formed during the heating step.

7. A method according to claim 6 wherein the adjusting step comprises the step of adding alkali to the fuel slurry.

8. A method according to claim 6 including the step of separating the char particles from a remainder of the char slurry including the halogen salts.

9. A method according to claim 8 including the step of removing water from the char slurry and thereafter at least partially drying the char particles and preparing pellets with the char particles.

10. A method according to claim 8 including the steps of washing the char particles removed from the char slurry with water substantially free of halogen salt and other undesirable impurities and thereafter reslurrying the washed char particles with water substantially free of halogen salt and other undesirable impurities.

11. A method according to claim 8 including the step of grinding at least a portion of the char particles.

12. A method according to claim 6 wherein the step of adjusting comprises adjusting the alkali content of the fuel slurry to less than the chemical equivalent of the halogen content.

13. A method according to claim 1 wherein the step of forming comprises the steps of furnishing solid waste, comminuting the waste, mixing the waste with water to form a waste slurry, subjecting the waste slurry to density separation to remove undesirable organic and inorganic materials which may be present in the waste slurry, and thereafter removing a portion of the water from the waste slurry to thereby form the fuel slurry including the fuel and water.

14. A method according to claim 1 wherein the step of forming comprises the steps of furnishing a fossil fuel in comminuted form, and forming the fuel slurry with the comminuted fossil fuel.

15. A method according to claim 14 including the step of at least partially forming the fuel slurry with Orimulsion.

16. A method according to claim 1 wherein the step of forming comprises the step of furnishing at least one of forestry waste, agricultural waste, sewage sludge and industrial waste treatment sludge as the carbonaceous fuel, reducing any oversize waste which is present into smaller waste particles, and suspending the smaller waste particles in water to thereby form the fuel slurry.

17. A method according to claim 13 including the step of subjecting the fuel slurry to density separation to remove undesirable components from the fuel slurry.

18. A method according to claim 1 wherein the step of forming comprises the step of providing a low grade carbonaceous fuel including cations, entraining it in water to form the fuel slurry, and adding to at least one of the fuel slurry and the char slurry an agent promoting the dissolution of the cations.

19. A method according to claim 18 wherein the step of adding comprises adding at least one of a surfactant, an acid, a peroxide, a sequestering agent and a chelating agent.

20. A method according to claim 1 including the step of separating the evolved gas substantially as formed from the char slurry.

21. A method according to claim 20 in which the step of separating comprises passing the heated fuel slurry through a plurality of reaction zones in series and separating the gas evolved from each zone.

22. A method according to claim 20 in which the step of separating comprises charging the partially heated fuel slurry to the top of a vertical reactor-stripper, and including maintaining a rising temperature gradient by applying sufficient heat to the bottom to reach the desired reaction temperature, and removing carbonization gas and steam from the top of the reactor-stripper.

23. A method according to claim 1 wherein the step of forming the fuel slurry comprises adding a fossil fuel and another, relatively low grade carbonaceous fuel.

24. A method according to claim 1 including the step of separating from the char slurry by density inorganic particles freed during the heating step.

25. A method according to claim 1 including the step of adding steam to the fuel slurry to directly heat the fuel slurry and dilute it with water condensed from the steam.

26. A method according to claim 25 including the step of incrementally depressurizing the char slurry, recovering steam during each incremental depressurizing step, pressurizing the fuel slurry in increments, and incrementally mixing recovered steam with the fuel slurry.

27. A method according to claim 26 including the step of providing the slurry with a viscosity of at least 1000 centipoises.

28. A method according to claim 26 wherein the incrementally recovered steam is indirectly condensed to transfer heat to incrementally heat the fuel slurry.

29. A method according to claim 1 wherein the step of forming comprises adding a first carbonaceous fuel including chlorine and a second carbonaceous fuel including alkali to the liquid, and wherein the heating step includes neutralizing the chlorine and the alkali with each other to thereby prevent corresponding portions thereof from occurring in the char slurry.

30. A method according to claim 29 wherein the first fuel comprises at least one of municipal solid waste, a refuse derived fuel, and a biomass fuel derived from agricultural or forestry waste products.

31. A method according to claim 1 wherein the step of heating comprises adding to the pressurized fuel slurry a previously heated fluid medium.

32. A method according to claim 31 wherein the step of adding comprises extracting the fluid medium from previously heated char slurry and recirculating the extracted fluid medium into the fuel slurry.

33. A method according to claim 31 wherein the step of adding comprises forming counter flowing flows of the fuel slurry and the fluid medium in a container while in direct contact with each other and extracting at least a portion of the fluid medium from the fuel slurry after the fluid medium has been cooled.

34. A method according to claim 1 wherein a viscosity of the slurries decreases as their temperature increases, and including the step of intermittently withdrawing liquid in its liquid or gaseous state from the slurries to limit the amount of liquid that is being heated while substantially maintaining the viscosity of the slurries within a desired range.

35. A method according to claim 1 wherein the liquid comprises at least one of water and a liquid fuel.

36. A continuously operable method of rendering relatively low grade carbonaceous fuel readily transportable and combustible comprising the steps of:
   forming a fuel slurry including the fuel and water;
   heating and pressurizing the fuel slurry so that it remains substantially in its liquid state while a substantial portion of oxygen chemically bound in molecules of the fuel is reacted into carbon dioxide to thereby form a char slurry including char particles derived from the fuel, water and undesirable contaminants, and an evolved gas;
   removing the evolved gas;
   segregating at least a substantial portion of the undesirable contaminants from the char slurry;
   adding sufficient water substantially free of undesirable contaminants to the char slurry to form a substantially contaminant free char product slurry;
   storing the char product slurry;
   thereafter transporting the char product slurry to a location of use; and
   thereafter using the char particles in the char product slurry.

37. A method according to claim 36 wherein the step of segregating includes segregating at least a portion of the water from the char slurry, rendering the segregated water substantially free of at least one of the undesirable contaminants, and thereafter recycling at least a portion of the segregated water to the fuel slurry.

38. A method according to claim 37 wherein the step of recycling includes the step of converting at least a portion of the water into steam and injecting the steam into the fuel slurry to thereby heat the fuel slurry.

39. A method according to claim 36 wherein the step of segregating includes the step of removing at least some organic material with water and undesirable contaminants from the char slurry, and including the step of combusting the organic material.

40. A method according to claim 39 wherein the organic material includes non-carbonized particles of a plastic material.

41. A method according to claim 36 wherein the step of adding comprises dewatering the char slurry to form wet char particles, and reslurrying the wet char particles in the water substantially free of undesirable contaminants.

42. A method according to claim 41 wherein the dewatering step comprises passing the char slurry through a dewatering device.

43. A continuously operable method of rendering relatively low grade carbonaceous fuel readily transportable and combustible comprising the steps of:
   forming a fuel slurry including the fuel and water;
   heating the fuel slurry to a reaction temperature sufficient to induce a reaction generating carbon dioxide from oxygen chemically bound in molecules of the carbonaceous fuel to convert the carbonaceous fuel into char particles suspended in water from the fuel slurry, the heating step including raising the temperature of the fuel slurry prior to the completion of the reaction with heat derived from the char slurry in which the reaction was previously completed to thereby cool the char slurry;
   pressurizing the fuel slurry sufficiently to maintain it substantially in its liquid state as its temperature rises to the reaction temperature;
   withdrawing gas evolved during the reaction from the char slurry;
   removing sufficient water including undesirable contaminants present in the char slurry to form a product comprising wet char particles;
   mixing the product with water substantially free of undesirable contaminant to form a char product slurry; and
   storing the char product slurry for later use.

44. A method according to claim 43 including the step of recycling into the fuel slurry at least a portion of the water including undesirable contaminants removed from the char slurry.

45. A method according to claim 44 including the step of removing from the recycled water undesirable contaminants present therein.

46. A continuously operable method of rendering relatively low grade carbonaceous fuel readily transportable and combustible, comprising the steps of:
   forming a fuel slurry including the fuel and water;
   increasing pressure and temperature of the fuel slurry in a plurality of increments to a final temperature and a pressure so that the slurry remains substantially in its liquid state and a reaction occurs converting oxygen bound in molecules of the carbonaceous fuel into carbon dioxide to thereby form a char slurry comprising char particles, water and undesirable contaminants in the water;
   subjecting the char slurry to a plurality of incremental temperature and pressure reductions sufficient to convert at each such reduction some of the water in the char slurry into steam; using the steam from the incremental temperature and pressure reductions to heat the fuel slurry at said plurality of increments by injecting the steam into the fuel slurry to thereby incrementally heat the slurry and recycle water from the char slurry to the fuel slurry;
   thereafter concentrating the char slurry by removing therefrom water including undesirable contaminants until a product comprising primarily wet char particles is obtained;
   reslurrying the wet char particles with water substantially free of undesirable contaminants to form a pumpable char product slurry; and
   storing the char product slurry for later use.

47. A method according to claim 46 wherein the char slurry includes soluble and insoluble organic and inorganic substances, separating from the char slurry a portion of the water including contaminants and at least a portion of the soluble and insoluble organic and inorganic substances, oxidizing at least a portion of the organic substances in the portion of the water to generate steam and a brine including inorganic substances, and injecting the steam into the fuel slurry at one of the incremental temperature increasing steps.

48. A method according to claim 46 including the step of removing gas as generated during the reaction.

49. A continuously operable method of rendering relatively low grade carbonaceous fuel readily transportable and combustible, comprising the steps of:
   providing an upright screw conveyor disposed in and surrounded by an upright, tubular housing;
   forming a fuel slurry including the carbonaceous fuel and an amount of water so that the slurry can be transported upwardly with the screw conveyor;

conveying the fuel slurry upwardly with the screw conveyor;

providing a fluid medium having a temperature higher than a temperature of the fuel slurry;

contacting the fuel slurry being transported upwardly by the screw conveyor with the fluid medium by flowing the fluid medium downwardly through the housing and through the fuel slurry being upwardly conveyed to thereby heat the fuel slurry, splitting off the carbon dioxide and forming a char slurry comprising char particles and water;

removing the fluid medium from the housing after it traveled at least partially over a length of the housing;

concentrating the char slurry by removing therefrom sufficient water to form a product comprising wet char particles;

reslurrying the wet char particles with water substantially free of undesirable contaminants to form a char product slurry; and storing the char product slurry for subsequent use.

50. A method according to claim 49 wherein the fluid medium comprises essentially water, and including the steps of modulating a pressure of the fuel slurry as it is conveyed upwardly through the housing so that there is at least one portion of the housing where there is a pressure gradient causing the fluid medium to flow downwardly.

51. A method according to claim 50 including the step of removing at least some of the downwardly flowing fluid medium from the housing above the portion thereof where there is the fluid pressure gradient.

52. A method according to claim 51 including the step of withdrawing the char slurry from the housing, transferring heat from the char slurry to water to lower the temperature of the char slurry and heat the water, and using the heated water as the fluid medium flowing downwardly through the housing.

53. A method according to claim 49 including the steps of positioning first and second substantially parallel screw conveyors in the housing so that flights of the conveyors overlap, and counter rotating the conveyors to move the fuel slurry upwardly through the housing.

54. A method according to claim 49 including the step of removing from the char slurry gas evolved during the contacting step.

55. A method according to claim 1 including the step of forming a combustible gas from the char particles after the storing step.

56. A method according to claim 1 including the step of subjecting the char particles to a liquid phase oxidation to produce low molecular weight organics from the char particles after the storing step.

57. A method according to claim 1 including the step of producing activated carbon from the char particles after the storing step.

58. A method according to claim 1 including the step of producing carbon black from the char particles after the storing step.

59. A method according to claim 1 including the step of pelletizing the char particles after the storing step.

60. A method according to claim 1 including the step of producing carbon fibers from the char particles after the storing step.

61. A method according to claim 1 including the step of producing synthetic gems from the char particles after the storing step.

62. A method according to claim 1 including the step of injecting the char slurry above the main flame of a boiler as a re-burning fuel.

63. A method according to claim 1 including the step of using the char slurry as a carrier for the injection of lime into a combustion zone.

64. A method according to claim 1 including the step of using the char slurry as a carrier for the injection of lime into a re-burning zone.

65. A method according to claim 43 in which the heating step comprises indirectly heating the fuel slurry with the latent heat of steam generated by reducing the pressure of the char slurry.

* * * * *